(12) United States Patent
Lee et al.

(10) Patent No.: US 10,921,808 B2
(45) Date of Patent: Feb. 16, 2021

(54) VEHICLE CONTROL DEVICE FOR CONTROLLING A VEHICLE

(71) Applicant: LG ELECTRONICS INC., Seoul (KR)

(72) Inventors: Jinkyo Lee, Seoul (KR); Nami Oh, Seoul (KR); Seongju Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 16/206,412

(22) Filed: Nov. 30, 2018

(65) Prior Publication Data
US 2019/0171209 A1     Jun. 6, 2019

(30) Foreign Application Priority Data

Dec. 1, 2017  (KR) .................. 10-2017-0164467

(51) Int. Cl.
| | | |
|---|---|---|
| *G05D 1/00* | (2006.01) | |
| *G06Q 50/30* | (2012.01) | |
| *G08G 1/00* | (2006.01) | |
| *G08G 1/14* | (2006.01) | |

(52) U.S. Cl.
CPC .......... *G05D 1/0088* (2013.01); *G06Q 50/30* (2013.01); *G08G 1/146* (2013.01); *G08G 1/147* (2013.01); *G08G 1/205* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 10,261,512 B1* | 4/2019 | Cullinane | B60R 25/24 |
| 10,290,212 B2* | 5/2019 | Kawagishi | G08G 1/143 |
| 2015/0339928 A1* | 11/2015 | Ramanujam | G06Q 50/30 |
| | | | 701/23 |
| 2015/0377635 A1* | 12/2015 | Beaurepaire | G01C 21/3423 |
| | | | 701/408 |
| 2017/0123423 A1* | 5/2017 | Sako | G05D 1/0088 |
| 2017/0329346 A1* | 11/2017 | Latotzki | G05D 1/0088 |
| 2018/0136656 A1* | 5/2018 | Rasmusson, Jr. | G01C 21/3638 |
| 2019/0163204 A1* | 5/2019 | Bai | G08G 1/202 |

FOREIGN PATENT DOCUMENTS

| | | |
|---|---|---|
| JP | 2009-276112 A | 11/2009 |
| JP | 2012-48563 A | 3/2012 |
| JP | 2016-57946 A | 4/2016 |
| JP | 2017-91557 A | 5/2017 |
| WO | WO 2016/147368 A1 | 9/2016 |

* cited by examiner

*Primary Examiner* — Abdhesh K Jha
(74) *Attorney, Agent, or Firm* — Birch, Stewart, Kolasch & Birch, LLP

(57) ABSTRACT

A vehicle control device for controlling a vehicle can include a sensor to detect an occupant of the vehicle getting out of the vehicle at a drop-off location; an interface unit; and a processor to determine a target parking spot for the vehicle based on information acquired through the interface unit, and in response to detecting the occupant getting out of the vehicle, transmit a control signal to a vehicle drive apparatus, via the interface unit, to park the vehicle at the target parking spot.

17 Claims, 25 Drawing Sheets

FIG. 16

|  | DISTANCE(km) | TIME(min) | RATE (KRW/10min) |
|---|---|---|---|
| FIRST SPOT | 1.0 km | 25 min | 1000KRW/10min |
| SECOND SPOT | 1.2 km | 35 min | 800KRW/10min |
| THIRD SPOT | 1.5 km | 50 min | 0KRW/10min |
| FOURTH SPOT | 2.0 km | 40 min | 500KRW/10min |

VEHICLE CONTROL DEVICE FOR CONTROLLING A VEHICLE

CROSS-REFERENCE TO RELATED APPLICATION

This application claims the priority benefit of Korean Patent Application No. 10-2017-0164467, filed in the Republic of Korea on Dec. 1, 2017, the entirety of which is incorporated herein by reference.

BACKGROUND OF THE INVENTION

1. Field of the Invention

The present invention relates to an operation system for a vehicle.

2. Description of the Related Art

A vehicle is an apparatus that moves in a direction desired by a user riding therein. A representative example of a vehicle may be an automobile.

Recently, vehicles have been equipped with various types of sensors and electronic devices for convenience of a user. In particular, Advance Driver Assistance Systems (ADASs) are being studied and researched briskly to improve driver convenience. In addition, efforts are being made to develop an autonomous vehicle.

Technologies related to an autonomous parking operation or an autonomous parking-out operation of an autonomous vehicle are being studied. Recently, autonomous parking technologies for allowing a driver to get off a vehicle at a location a predetermined distance from a parking spot and enabling the vehicle to be parked autonomously have almost become a reality. In addition, autonomous parking-out or pulling-out technologies for enabling a vehicle to exit to a location a predetermined distance by leaving from a parking space and then allowing a driver to get in the vehicle have also started to develop. That is, the so-called valet parking function or pick-up function can be performed by a vehicle itself.

However, the autonomous parking and parking-out operations are functions that are performed by a vehicle once a trigger signal is input by a driver. Therefore, there is need for a more intelligent control method of an autonomous vehicle, a method which enables a vehicle to perform the autonomous parking operation by determining whether autonomous parking operation is needed.

SUMMARY OF THE INVENTION

The present invention has been made in view of the above problems, and it is one object of the present invention to provide an operation system for enabling an autonomous vehicle to determine whether to park itself and to perform a parking operation.

It is another object of the present invention to provide a control method for enabling a vehicle to determine a target parking spot and perform a parking operation.

It is another object of the present invention to provide an operation system for determining a time for driving a vehicle itself, and for controlling the vehicle to travel.

Objects of the present invention should not be limited to the aforementioned objects and other unmentioned objects will be clearly understood by those skilled in the art from the following description.

In accordance with an embodiment of the present invention, the above and other objects can be accomplished by the provision of an operation system for a vehicle, including: a sensor configured to detect an occupant's getting out of the vehicle; an interface unit; and a processor configured to determine a target parking spot for the vehicle, and, upon detection of the occupant's getting off, provide a control signal to a vehicle drive apparatus via the user interface unit to park the vehicle at the target parking spot.

The details of other embodiments are included in the following description and the accompanying drawings.

The embodiments of the present invention have one or more effects as follows.

First, since a target parking spot for a vehicle is determined for an autonomous parking operation by itself, a user's input is not needed, and thus, it is possible to control the vehicle in a user friendly way.

Second, since a vehicle determines whether to park itself and perform an autonomous parking or a driving operation based on the determination, it is possible to control the vehicle intelligently according to a situation.

Third, since the vehicle is capable of determining which type of driving is required by itself, even without a user input, it is possible to improve user convenience and control the vehicle safely.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein:

FIG. 16 is a diagram illustrating operation S200 in FIG. 9 of determining a target parking spot for a vehicle according to an embodiment of the present invention;

DETAILED DESCRIPTION OF THE EMBODIMENTS

Figure 1:
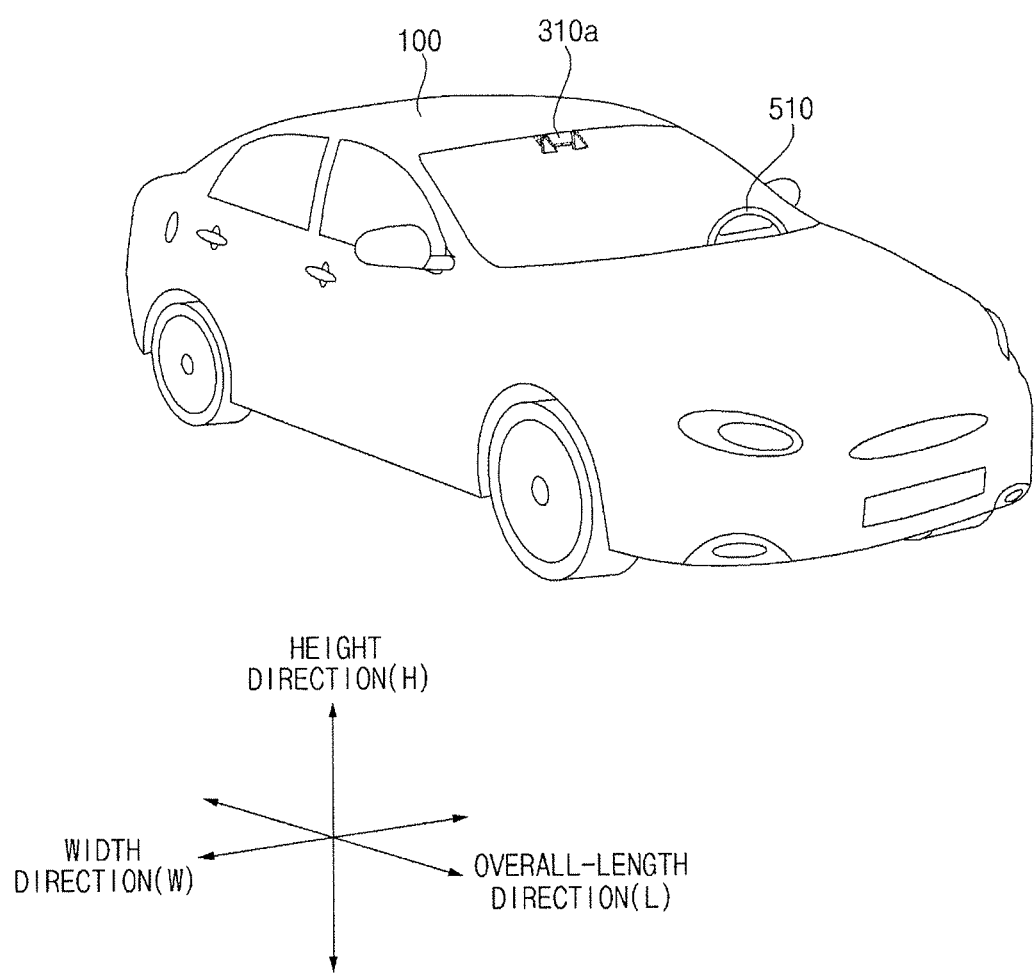
FIG. 1 is a diagram illustrating the external appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. Alternatively, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present invention.

Figure 2:
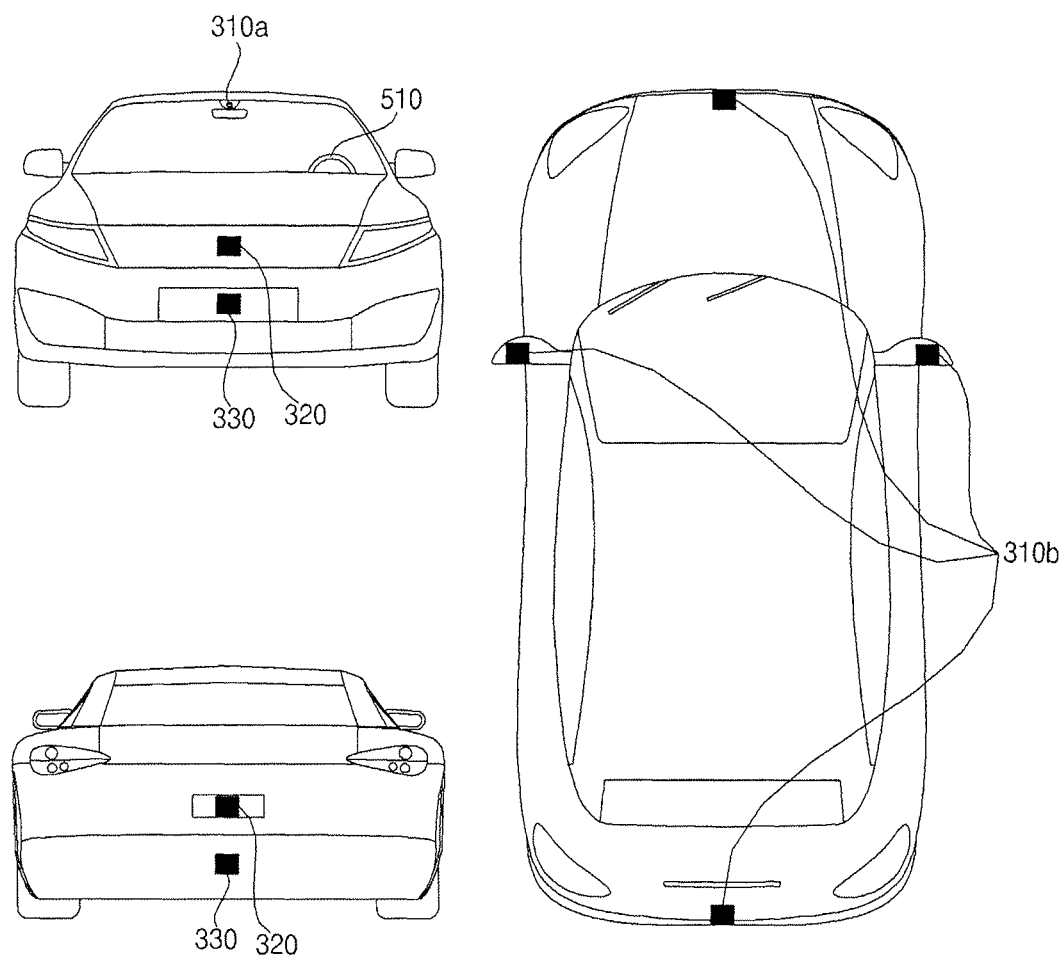
FIG. 2 are different angled views of the external appearance of a vehicle according to an embodiment of the present invention.

FIG. 2 is different angled views of a vehicle according to an embodiment of the present invention.

Figure 3:
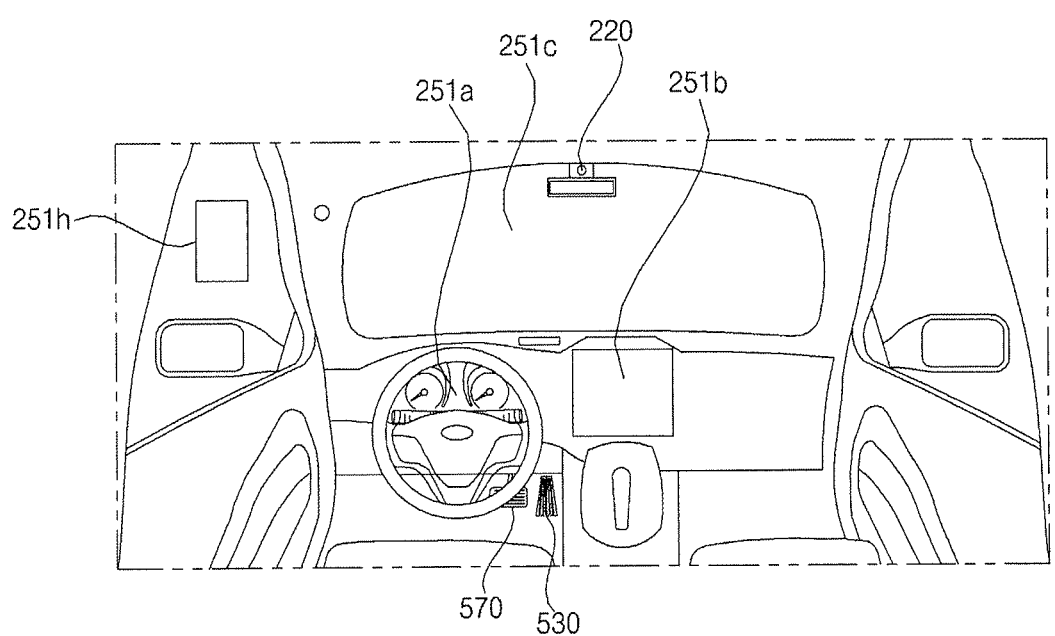
FIGS. 3 and 4 are diagrams illustrating the interior configuration of a vehicle according to an embodiment of the present invention.
Figure 4:
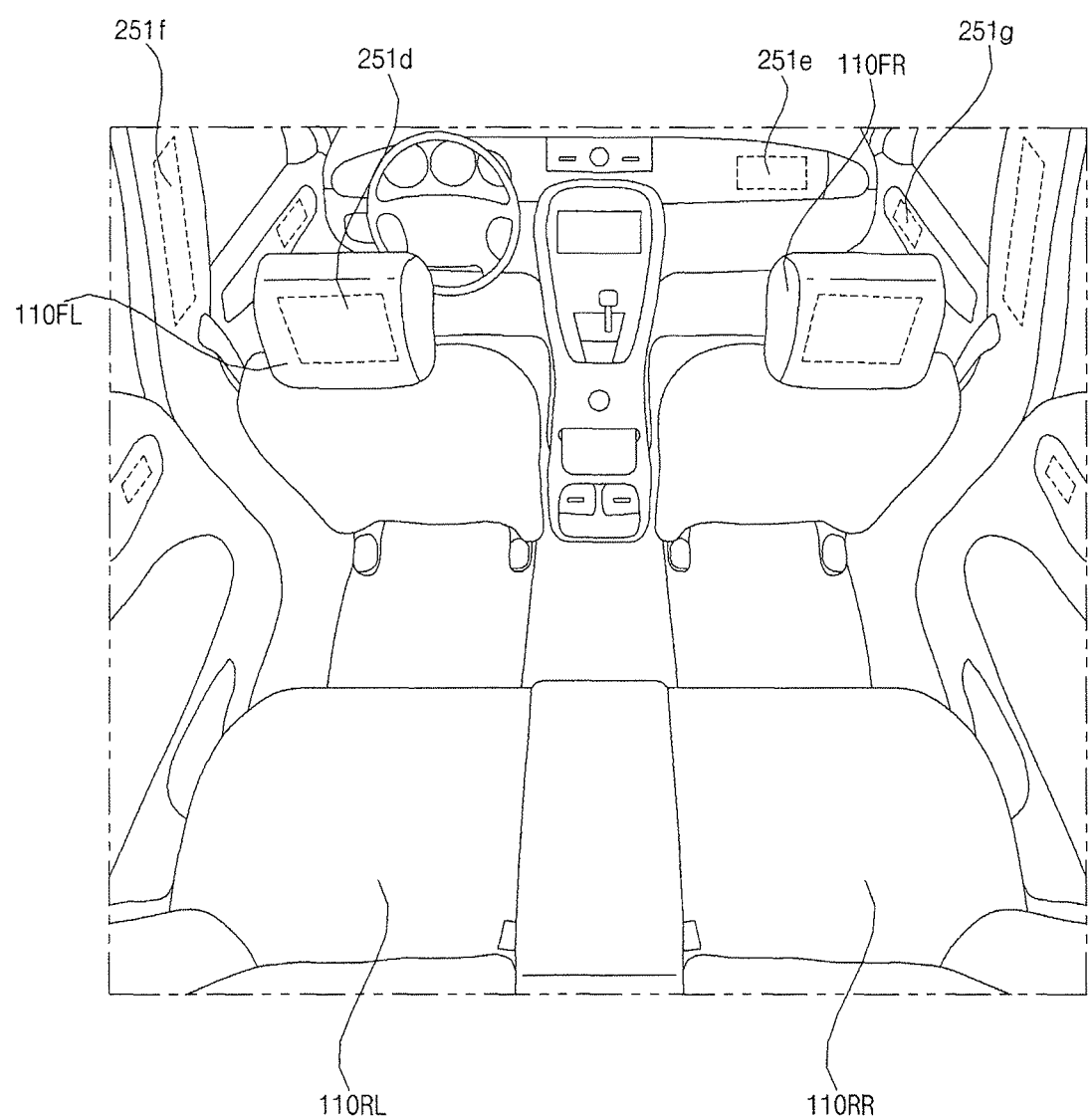

FIGS. 3 and 4 are views of the internal configuration of a vehicle according to an embodiment of the present invention.

Figure 5:
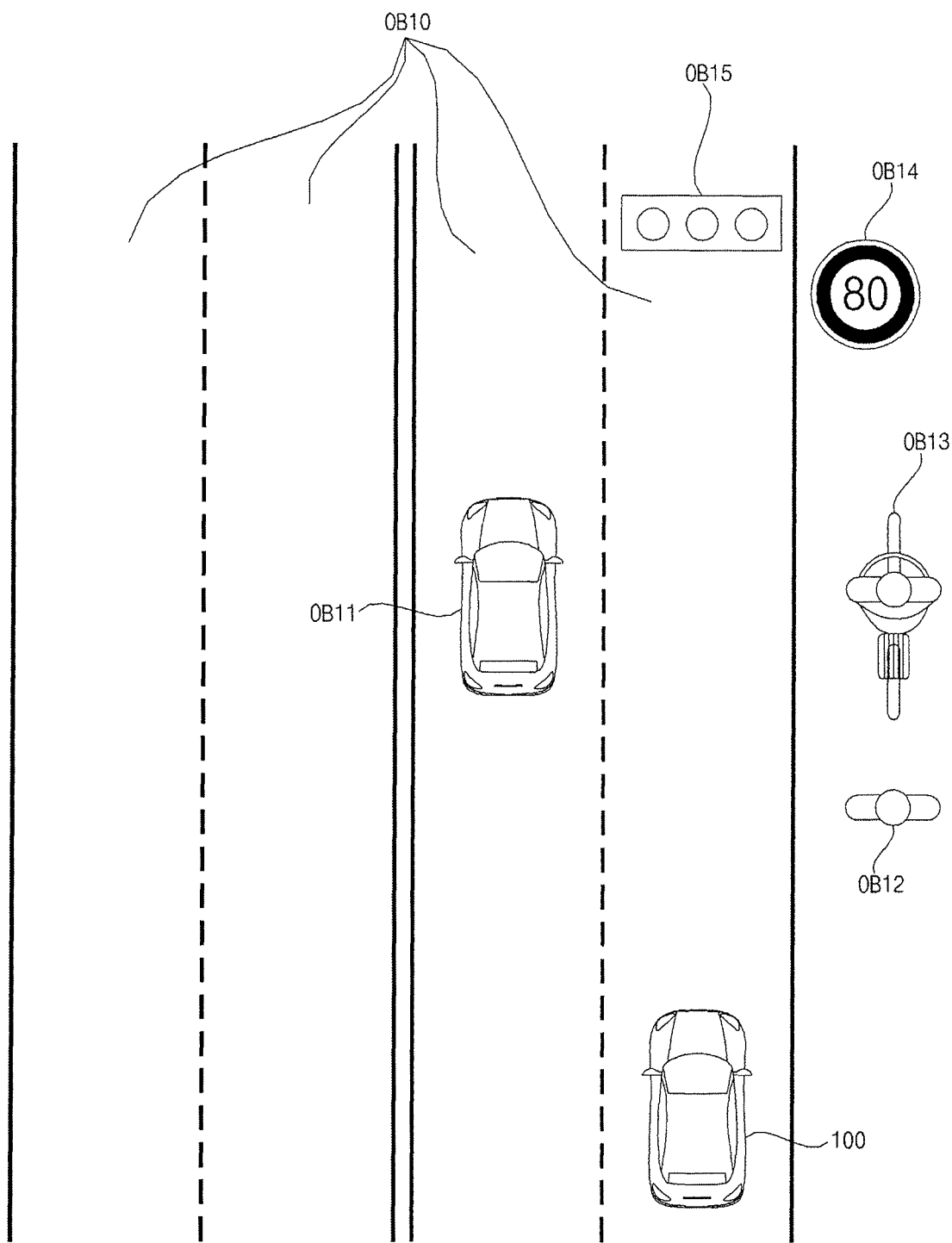
FIGS. 5 and 6 are diagrams illustrating an object according to an embodiment of the present invention.
Figure 6:
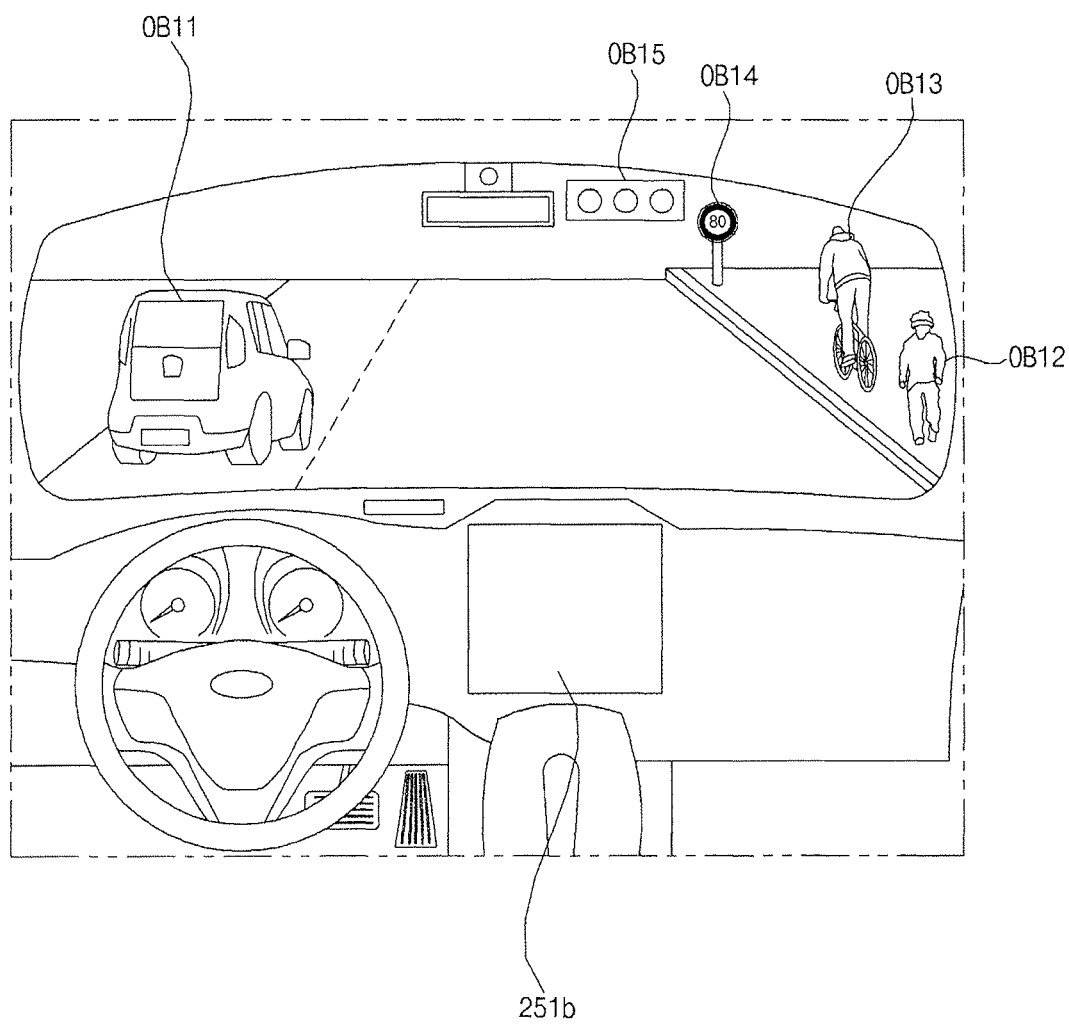

FIGS. 5 and 6 are views for explanation of objects according to an embodiment of the present invention.

Figure 7:
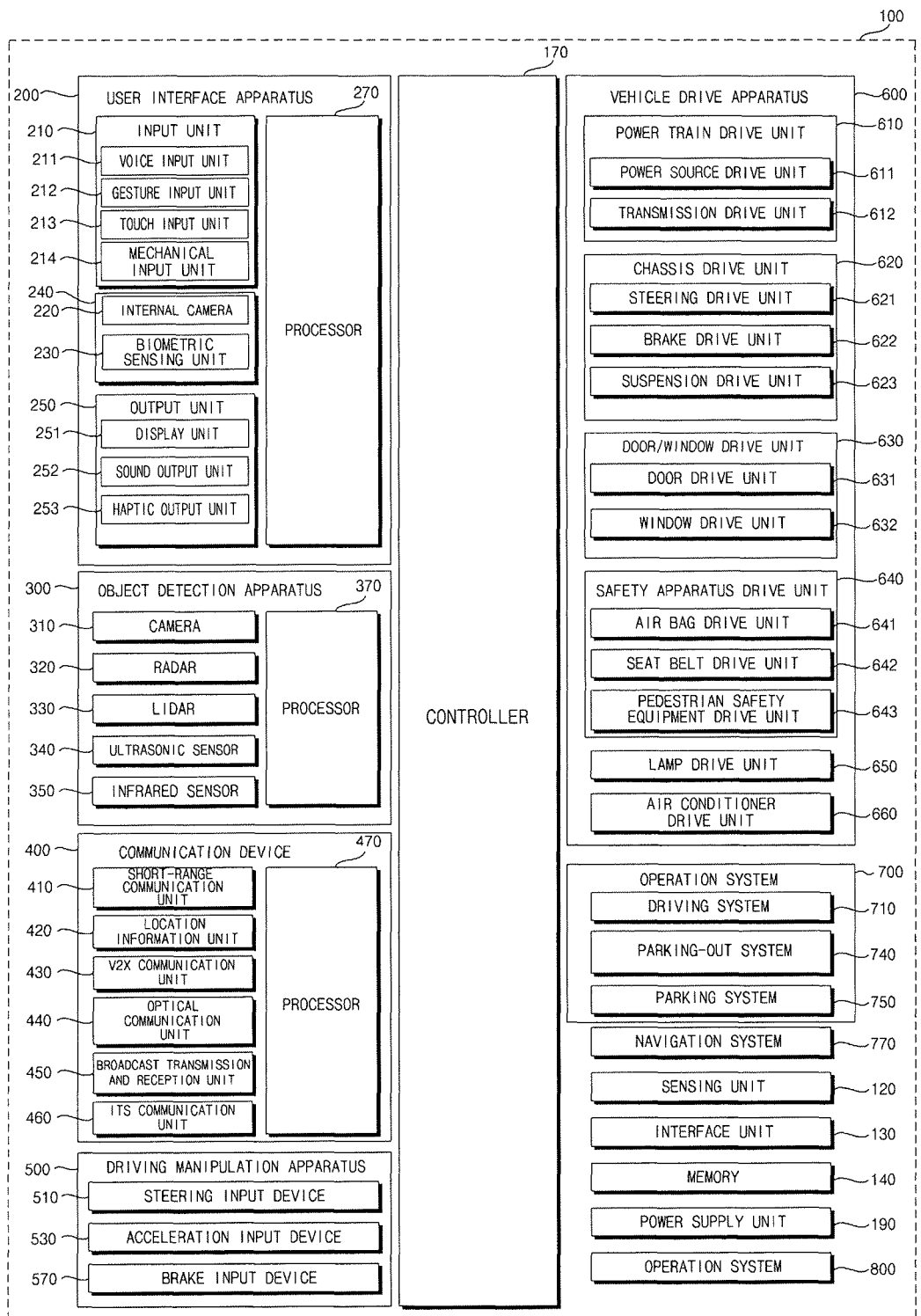
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through a user interface device 200, the vehicle 100 may be switched from a manual mode to an autonomous driving mode, or vice versa.

The vehicle 100 may be switched to an autonomous mode or a manual mode based on driving situation information.

The driving situation information may include at least one of information on an object outside a vehicle, navigation information, and vehicle condition information.

For example, the vehicle 100 may be switched from the manual mode to the autonomous driving mode, or vice versa, based on driving situation information generated in the object detection apparatus 300.

In another example, the vehicle 100 may be switched from the manual mode to the autonomous driving mode, or vice versa, based on driving situation information received through a communication apparatus 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated in a driving system 710, a parking-out system 740, and a parking system 750.

In the manual mode, the autonomous vehicle 100 may receive a user input for driving the vehicle 100 through a driving manipulation apparatus 500. The vehicle 100 may operate based on the user input received through the driving manipulation apparatus 500.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the operation system 700, a navigation system 770, a sensing unit 120, an interface 130, a memory 140, a controller 170, and a power supply unit 190.

In some embodiments, the vehicle 100 may further include other elements in addition to elements described in this specification, or may not include some of the elements described in this specification.

The sensing unit 120 may sense a state of a vehicle. The sensing unit 120 may include an attitude sensor (e.g., a yaw sensor, a roll sensor, a pitch sensor), a collision sensor, a wheel sensor, a speed sensor, a tilt sensor, a weight detection sensor, a heading sensor, a gyro sensor, a position module, a vehicle forward/rearward sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, a brake pedal position sensor, etc.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this instance, the interface 130 may exchange data with the mobile terminal.

In addition, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as a sub-element of the controller 170.

The controller 170 may control the overall operation of each unit inside the vehicle 100. The controller 170 may be referred to as an Electronic Control Unit (ECU).

The power supply unit 190 may supply power required to operate each component under control of the controller 170. In particular, the power supply unit 190 may receive power from, for example, a battery inside the vehicle 100.

One or more processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

In addition, the sensing unit 120, the interface unit 130, the memory 140, the power supply unit 190, the user interface apparatus 200, the object detection apparatus 300, the communication apparatus 400, the driving manipulation apparatus 500, the vehicle drive apparatus 600, the operation system 700, and the navigation system 770 may include individual processors, respectively, or may be integrated into the controller 170.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal sensor unit 240, an internal camera 220, a biometric sensing unit 230, an output unit 250, and a processor 270. Each element of the user interface apparatus 200 may be separated from or integrated with the interface unit 130 structurally or functionally.

In some embodiments, the user interface apparatus 200 may further include other components in addition to the aforementioned components, or may not include some of the aforementioned components.

The input unit 210 is configured to receive information from a user, and data collected in the input unit 210 may be analyzed by the processor 270 and processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. Thus, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

In response to a user input on at least one of the voice input unit 211, the gesture input unit 212, the touch input unit 213, and the mechanical input unit 214, the processor 270 may initiate a learning mode of the vehicle 100. In the learning mode, the vehicle 100 may perform travel path learning and surrounding environment learning. The learning mode will be described in detail with reference to the object detection apparatus 300 and the operation system 700.

The internal camera 220 may acquire images of the inside of the vehicle 100. The processor 270 may sense a user state based on the images of the inside of the vehicle 100. The processor 270 may acquire information about a user's gaze from an image of the inside of the vehicle 100. The processor 270 may detect a user's gesture from the image of the inside of the vehicle 100.

The biometric sensing unit 230 may acquire biometric information of the user. The biometric sensing unit 230 may include a sensor for acquire biometric information of the user, and may utilize the sensor to acquire a user's finger print information, heart rate information, etc. The biometric information may be used to authenticate a user's identity.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In addition, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. Thus, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR to allow a user to recognize the output.

The processor 270 may control the overall operation of each unit of the user interface apparatus 200.

In some embodiments, the user interface apparatus 200 may include a plurality of processors 270 or may not include any processor 270.

In the situation where the user interface apparatus 200 does not include any processor 270, the user interface apparatus 200 may operate under control of the controller 170 or a processor of a different device inside the vehicle 100.

In addition, the user interface apparatus 200 may be referred to as a display device for vehicle.

The user interface apparatus 200 may operate under the control of the controller 170.

The object detection apparatus 200 is used to detect an object located outside the vehicle 100.

The object detection apparatus 200 may generate object information based on sensing data.

The object information may include information about the presence of an object, information about a location of the object, information about a distance between the vehicle 100 and the object, and information about a speed of the vehicle 100 relative to the object.

The object may include various objects related to traveling of the vehicle 100.

Referring to FIGS. 5 and 6, an object "O" may include a lane OB10, another vehicle OB11, a pedestrian OB12, a two-wheeled vehicle OB13, a traffic sign OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is traveling in the opposite direction. The lane OB10 may include left and right lines that define the lane.

Another vehicle OB11 may be a vehicle traveling in the vicinity of the vehicle 100. Another vehicle OB11 may be a vehicle within a predetermined distance from the vehicle 100. For example, another vehicle OB11 may be a vehicle that is preceding or following the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic sign may include a traffic lamp OB15, a roadside sign OB14, and a pattern or text painted on a road surface.

The light may be light generated by a lamp provided in another vehicle OB11. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic lamp, and a bridge.

The geographical feature may include a mountain and a hill.

The object may be classified as a movable object or a stationary object. For example, the movable object may be a concept including another vehicle and a pedestrian. For example, the stationary object may be a concept including a traffic sign, a roadway, and a structure.

The object detection apparatus 300 may include a camera 310, a radar 320, a lidar 330, an ultrasonic sensor 340, an infrared sensor 350, and a processor 370. Each element of the object detection apparatus 300 may be separated from or integrated with the sensing unit 120 structurally or functionally.

In some embodiments, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire information on a location of an object, information on a distance to the object, and information on a speed relative to the object.

For example, the camera 310 may acquire the information on the distance to the object and the information on the speed relative to the object, based on a change in size of the object over time in acquired images.

For example, the camera 310 may acquire the information on the distance to the object and the information on the speed relative to the object through a pin hole model or through profiling a road surface.

In another example, the camera 310 may acquire the information on the distance to the object and the information on the speed relative to the object, based on information on disparity between stereo images acquired by the stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 270.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive-type lidar or a non-drive type lidar.

When implemented as the drive-type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of an object in acquired images, the processor 370 may acquire information on distance to the object and information on speed relative to the object.

For example, the processor 370 may acquire information on distance to an object and information on speed relative to the object, by utilizing a pin hole model or by profiling a road surface.

For example, based on information on disparity of stereo images acquired by a stereo camera 310*a*, the camera 310 may acquire the information on distance to an object and information on speed relative to the object.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described above, once a learning mode of the vehicle is initiated in response to a user input on the input unit 210, the processor 270 may store, in the memory 140, data sensed by the camera 310, the radar 320, the lidar 330, the ultrasonic sensor 340, and the infrared sensor 350.

Each step in a learning mode based on analysis of stored data, and an operating mode following the learning mode will be described later in more detail with reference to the operation system 700. In some embodiments, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the situation where the object detection apparatus 300 is not included in the processor 370, the object detection apparatus 300 may operate under the control of the controller 170 or a processor inside the vehicle 100.

The object detection apparatus 300 may operate under the control of the controller 170.

The communication apparatus 400 is configured to perform communication with an external device. The external device may be a different vehicle or a server.

To perform communication, the communication apparatus 400 may include at least one selected from a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some embodiments, the communication apparatus 400 may include a plurality of processors 470, or may not include any processor 470.

In the situation where the communication apparatus 400 does not include the processor 470, the communication apparatus 400 may operate under control of the controller 170 or a processor of a device inside of the vehicle 100.

In addition, the communication apparatus 400 may implement a vehicle display device, together with the user interface apparatus 200. In this instance, the vehicle display device may be referred to as a telematics device or an Audio Video Navigation (AVN) device.

The communication apparatus 400 may operate under the control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some embodiments, the steering input device may be configured as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive apparatus 600 may further include other components in addition to the aforementioned components, or may not include some of the aforementioned components.

In addition, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the situation in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the situation where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In addition, in the situation where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In addition, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus to reduce the vibration of the vehicle 100.

In addition, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner to supply cool air to the inside of the vehicle 100.

The vehicle drive apparatus 600 may include a processor. Each unit of the vehicle dive apparatus 600 may include its own processor.

The vehicle drive apparatus 600 may operate under control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some embodiments, the operation system 700 may further include other components in addition to the aforementioned components, or may not include some of the aforementioned component.

In addition, the operation system 700 may include a processor. Each unit of the operation system 700 may include its own processor.

In addition, the operation system 700 may control operation of an autonomous driving mode based on learning. In this instance, an operating mode may operate on the premise of completion of the learning mode and its learning process. How a process of the operation system 700 operates the learning mode and the operating mode will be described below.

The learning mode may operate in the aforementioned manual mode. In the learning model, the processor of the operation system 700 may perform travel path learning and surrounding environment learning.

The travel path learning may include a step of generating map data related to a travel path along which the vehicle 100 is currently traveling. In particular, the processor of the operation system 700 may generate the map data based on information which is detected by the object detection apparatus while the vehicle 100 travels from a start point to a destination.

The surrounding environment learning may include a step of storing and analyzing information about a surrounding environment of the vehicle 100 while the vehicle 100 is traveling or being parked. In particular, the processor of the operation system 700 may store and analyzing the information about a surrounding environment of the vehicle 100 based on information which is detected using the object detection apparatus in the middle of parking of the vehicle 100, such as location information of a parking space, size information of the parking space, and stationary (or non-stationary) obstacle information.

The operating mode may operate in the autonomous driving mode. The operating mode is described on the premise that travel path learning or surrounding environment learning has completed through the learning mode.

The operating mode may operate in response to a user input applied through the input unit 210, or may automatically operate when the vehicle 100 reaches a travel path or a parking space on which learning has been completed.

The operating mode may include: a semi-autonomous operating mode in which a user's manipulation on the driving manipulation apparatus 500 is partially required; and a fully autonomous operating mode in which a user's manipulation on the driving manipulating apparatus 500 is not required at all.

In addition, in some embodiments, the processor of the operation system 700 may control the driving system 710 in the operating mode so that the vehicle 100 travels along a travel path on which learning has been completed.

In addition, in some embodiments, the processor of the operation system 700 may control the parking-out system 740 in the operating mode so that the vehicle 100 exits from a parking space on which learning has been completed.

In addition, in some embodiments, the processor of the operation system 700 may control the parking system 750 in the operating mode so that the vehicle 100 is parked into a parking space on which learning has been completed.

In addition, in some embodiments, in the situation where the operation system 700 is implemented as software, the operation system 700 may be a subordinate concept of the controller 170.

In addition, in some embodiments, the operation system 700 may be a concept including at least one selected from among the user interface apparatus 200, the object detection apparatus 300, the communication apparatus 400, the driving manipulation apparatus 500, the vehicle drive apparatus 600, the navigation system 770, the sensing unit 120, and the controller 170.

In addition, in some embodiments, the operation system 700 may be a concept including at least one selected from among the user interface apparatus 270, the object detection apparatus 300, the communication apparatus 400, the driving manipulation apparatus 500, the vehicle drive apparatus 600, the navigation system 770, the sensing unit 120, and the controller 170.

The driving system 710 may control the vehicle 100 to travel.

The driving system 710 may receive navigation information from the navigation system 700 and provide a control signal to the vehicle drive apparatus 600 to control the vehicle 100 to travel.

The driving system 710 may receive a signal from an external device through the communication apparatus 400 and provides a control signal to the vehicle drive apparatus 600 to control the vehicle 100 to travel.

The driving system 710 may receive a signal from an external device through the communication apparatus 400 and provide a control signal to the vehicle drive apparatus 600 to control the vehicle 100 to travel.

The driving system 710 may be a system which includes at least one selected from among the user interface apparatus 270, the object detection apparatus 300, the communication apparatus 400, the driving manipulation apparatus 500, the vehicle drive apparatus 600, the navigation system 770, the sensing unit 120, and the controller 170 to control the vehicle 100 to travel.

The driving system 710 may be referred to as a vehicle driving control apparatus.

The parking-out system 740 may control the vehicle 100 to exit from a parking space.

The parking-out system 740 may receive navigation information from the navigation system 770 and provide a control signal to the vehicle drive apparatus 600 to control the vehicle 100 to exit a parking space.

The parking-out system 740 may receive object information from the object detection apparatus 300 and provide a control signal to the vehicle drive apparatus 600 to control the vehicle 100 to exit a parking space.

For example, the parking-out system 740 may receive a signal from an external device through the communication apparatus 400 and provide a control signal to the vehicle drive apparatus 600 to control the vehicle 100 to exit a parking space.

The parking-out system 740 may be a system which includes at least one selected from among the user interface apparatus 200, the object detection apparatus 300, the communication apparatus 400, the driving manipulation apparatus 500, the vehicle drive apparatus 600, the navigation system 700, the sensing unit 120, and the controller 170 to control the vehicle 100 to exit a parking space.

The parking-out system 740 may be referred to as a vehicle parking-out control apparatus.

The parking system 750 may control the vehicle 100 to park itself.

The parking system 750 may receive navigation information from the navigation system 770 and provide a control signal to the vehicle drive apparatus 600 to control the vehicle 100 to park itself.

The parking system 750 may receive object information from the object detection apparatus 300 and provide a control signal to the vehicle drive apparatus 600 to control the vehicle 100 to park itself.

The parking system 750 may receive a signal from an external device through the communication apparatus 400 and provide a control signal to the vehicle drive apparatus 600 to control the vehicle 100 to park itself.

The vehicle parking 750 may be a system which includes at least one selected from among the user interface apparatus 270, the object detection apparatus 300, the communication apparatus 400, the driving manipulation apparatus 500, the vehicle drive apparatus 600, the navigation system 700, the sensing unit 120, and the controller 170 to control the vehicle 100 to park itself.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication apparatus 400.

In some embodiments, the navigation system 770 may be classified as a subordinate element of the user interface apparatus 200.

Figure 8:
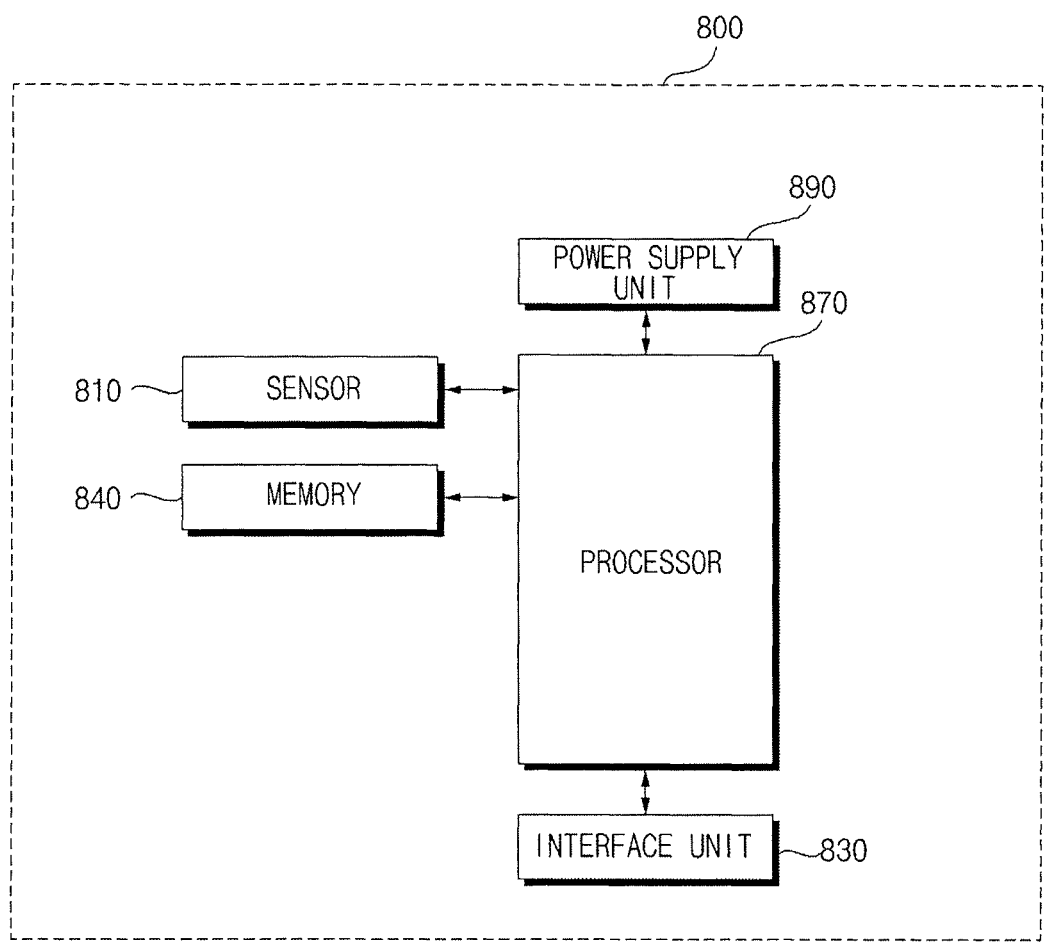
FIG. 8 is a block diagram illustrating an operation system according to an embodiment of the present invention.

FIG. 8 is a block diagram illustrating an operation system according to an embodiment of the present invention.

Referring to FIG. 8, an operation system 800 may include a sensor 810, an interface unit 830, a memory 840, a processor 870, and a power supply unit 890.

The operation system 800 may be separated from or integrated with the operation system 700 structurally or functionally.

The same description about the operation system 700 may be applied to the operation system 800.

The sensor 810 may detect an occupant's getting out of the vehicle.

When the occupant's getting off is detected, the sensor 810 may provide a detection signal to the processor 870, The sensor 810 may be provided separately from an object detection apparatus 300 and a sensing unit 120.

The sensor 810 may be a sensor provided in an object detection apparatus 300 or a sensing unit 120.

The sensor 810 may be controlled by the processor 870.

The interface unit 830 may serve as a passage to various types of external devices connected to the vehicle 100.

The interface unit 830 may serve as a passage which supplies electrical energy to a connected mobile terminal.

The same description about the aforementioned interface unit 130 may be applied to the interface unit 830.

The memory 840 may store various data for the overall operation of the operation system 800, such as programs for the processing or control of the processor 870.

The memory 840 may be separated or integrated with the memory 140 structurally or functionally.

In some embodiments, the memory 840 may be integrally formed with the processor 870 or may be implemented as a sub-element of the processor 870.

The processor 870 can control overall operation of each unit of the operation system 800.

The processor 717 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

In addition, the interface unit 830, the memory 840, and the power supply unit 890 may include their own processors or may be integrated with the processor 870.

The processor 870 can determine a target parking spot for the vehicle 100 based on information acquired using the interface unit 830.

Using the interface unit 830, the processor 870 can acquire location information of the vehicle 100 from the navigation system of the vehicle 100.

Using the interface unit 820, the processor 870 can acquire location information of the vehicle 100 from the communication apparatus 400, specifically a location information unit 420 of the communication apparatus 400.

Using the interface unit 830, the processor 870 can acquire information about an image of the outside of the vehicle 100 from the object detection apparatus 300.

The processor 870 can generate location information of the vehicle 100 based on the acquired image information.

For example, when it is determined, based on the acquired image information, that an object located in the surroundings of the vehicle 100 corresponds to a pre-stored object, the processor 870 can determine that location information of the pre-stored object is location information of the vehicle 100.

Alternatively, using the interface unit 830, the processor 870 can acquire location information of the vehicle 100 from the object detection apparatus 300.

The processor 870 can determine a target parking spot for the vehicle 100 based on the location information of the vehicle 100.

Based on the location information of the vehicle 100, the processor 870 can determine whether the vehicle 100 is located in a parking allowed spot.

When it is determined that the vehicle 100 is located in a parking allowed spot, the processor 870 can determine that where the vehicle 100 is currently located is a target parking spot.

When it is determined that the vehicle 100 is not located in a parking allowed spot, the processor 870 can determine a target parking spot that needs the vehicle 100 to move from the current location to another place.

The processor 870 can determine whether a parking allowed place exists within a preset distance from the current location of the vehicle 100.

The processor 870 can determine that a parking allowed place existing within the predetermined distance from the current location of the vehicle 100 is a target parking spot.

A parking allowed place may be defined as including the concept of a place where the vehicle 100 can be parked, such as a parking lot, and the concept of a state of a place where the vehicle 100 can be parked because the place is not occupied by another vehicle.

When an occupant's getting off is detected or when it is determined that an occupant is about to get off, the processor 870 can determine a target parking spot.

When it is determined, based on information about an image of the inside of the vehicle 100 acquired by the sensor 120, that an occupant is about to get off or exit the vehicle, the processor 870 can determine a target parking spot.

When it is determined, based on at least one of vehicle state information acquired from the sensing unit 120 and vehicle location information, that the vehicle 100 has stopped or is about to stop and thus that an occupant is about to get off, the processor 870 can determine a target parking spot.

If it is determined, based on at least one of object information acquired from the object detection apparatus 300, vehicle state information, and occupant state information about an occupant inside the vehicle 100, the processor 870 can determine whether to stop the vehicle 100 at a parking allowed spot.

Based on at least one of object information acquired from the object detection apparatus 300, vehicle state information, and occupant state information about an occupant inside the vehicle 100, the processor 870 can determine whether the occupant is about to get off.

The processor 870 can determine that a parking allowed place is a target parking spot, which the vehicle 100 can reach by traveling a travel distance less than a preset distance.

The processor 870 can determine a travel path from the current location of the vehicle 100 to the parking allowed place.

The processor 870 can determine a travel distance that the vehicle 100 needs to travel when moving to the parking allowed place along the travel path.

The travel distance may be defined as a distance that is measured by a meter in the vehicle 100 when the vehicle 100 travels along the travel path.

The processor 870 can determine that a parking allowed place which the vehicle 100 can reach from the current location within a period of time less than a preset period of time is a target parking spot.

The processor 870 can determine a time required for the vehicle 100 to travel to the parking allowed place along a travel path.

The processor 870 can determine whether to perform an autonomous parking operation to park the vehicle 100 in the target parking spot.

Before or after an occupant gets off the vehicle 100, the processor 870 can determine whether to perform the autonomous parking operation.

When the occupant's getting off and exiting the vehicle is detected or when it is determined that the occupant is about to get off soon, the processor 870 can determine whether to perform the autonomous parking operation.

When it is determined, based on information about an image of the inside of the vehicle 100 acquired by the sensing unit 120, that an occupant is about to get off, the processor 870 can determine whether to autonomously park the vehicle 100.

When it is determined, based on at least one of vehicle state information acquired by the sensing unit 120 and vehicle location information, that the vehicle 100 has stopped or is about to stop and that an occupant is about to get off, the processor 870 can determine whether to perform the autonomous parking operation.

Based on at least one of object information acquired by the object detection apparatus 300, vehicle state information, and occupant state information about an occupant inside the vehicle 100, the processor 870 can determine whether to control the vehicle 100 to be stopped at a stopping allowed spot.

Based on at least one of object information acquired by the object detection apparatus 300, vehicle state information, and occupant state information about an occupant inside the vehicle 100, the processor 870 can determine whether the occupant is about to get off.

As whether to perform the autonomous parking operation is determined before the occupant gets off the vehicle 100, the processor 870 can control the vehicle 100 to move to a destination immediately after the occupant gets off the vehicle 100.

Determining whether to perform the autonomous parking operation will be described in the following.

When it is determined to perform the autonomous parking operation, the processor 870 can provide a control signal to the vehicle drive apparatus 600 via the interface unit 830 so that the vehicle 100 is parked in a target parking spot.

When an occupant's getting out of the vehicle is detected, the processor 870 can provide a control signal to the vehicle drive apparatus 600 via the interface unit 830 so that the vehicle 100 is parked in a target parking spot.

When a control signal indicative of detection of the occupant's getting off to exit the vehicle is acquired from the sensor 810, the processor 870 can provide a control signal to the vehicle drive apparatus 600 via the interface unit 830 to perform the autonomous parking operation.

Thus, the processor 870 can control the vehicle 100 to move safely after an occupant gets off.

Based on a travel period and a return period, the processor 870 can determine whether to perform the autonomous parking operation to autonomously park the vehicle 100 in a target parking spot.

The processor 870 can determine a travel period required to move from the current location of the vehicle 100 to the target parking spot and then back to the current location of the vehicle 100.

A travel period may be defined as a time which is required for the vehicle 100 to move from the current location of the vehicle 100 to the target parking spot and then move from the target parking spot to the boarding location of an occupant.

When a target parking spot is determined, the processor 870 can generate a travel path from the current location of the vehicle 100 to the target parking spot and back to the current location of the vehicle 100.

The processor 870 can determine a travel period required for the vehicle 100 to travel along the generated travel path.

The processor 870 can acquire surrounding environment information related to the travel path from a device external to the vehicle 100.

The processor 870 can determine a travel period based on the acquired surrounding environment information and the generated travel path.

The processor 870 can determine a return period required for an occupant to get on the vehicle 100 again after getting off.

The return period may be defined as a time required for an occupant to return back to the vehicle 100 after getting out of the vehicle.

When a user inputs a time for returning to the vehicle 100 using the user interface apparatus 200, the processor 870 can determine that the input time is a return period.

Via the interface unit 830, the processor 870 can acquire a user's time input information sensed by at least one of the voice input unit 211, the gesture input unit 212, the touch input unit 213, and the mechanic input unit 214. The processor 870 can determine the return period based on the acquired time input information.

If a user inputs a place of visit using the user interface apparatus 200, the processor 870 can determine a return period based on preset information that corresponds to the place of visit (e.g., be back in 5 min).

A method of how the processor 870 determines a return period will be described below.

Based on a determination of whether to perform an autonomous parking operation, the processor 870 can control the vehicle drive apparatus 600.

When it is determined, based on information acquired from at least one of the object detection apparatus 300 and the communication apparatus 400, that an occupant has moved out of the vehicle 100 by a predetermined distance or more, the processor 870 can perform the autonomous parking operation.

When it is determined, based on information acquired from at least one of the object detection apparatus 300 and the communication apparatus 400, that an occupant has been out of the vehicle 100 for a predetermined period or more, the processor 870 can perform the autonomous parking operation.

The processor 870 can acquire, from the sensor 810, a signal indicative of detection of the occupant's getting off.

Based on the signal indicative of the occupant's getting off of the vehicle acquired from the sensor 810, the processor 870 can determine whether the occupant has been out of the vehicle 100 for a predetermined period or more.

The processor 870 can acquire information from at least one of the sensing unit 120, the object detection apparatus 300, and the communication apparatus 400 via the interface unit 830.

The processor 870 can acquire information about an image of the inside of the vehicle 100 from the sensing unit 120.

Based on information about an image acquired by the sensing unit 120, the processor 870 can determine whether a predetermined period of time has elapsed after an occupant got off.

The processor 870 can acquire information about an object in the surroundings of the vehicle 100 from the object detection apparatus 300.

The information about the object may include information about the presence of the object, location information of the object, information about a distance between the vehicle 100 and the object, and information about a relative speed between the vehicle 100 and the object.

The object may be any of various object related to travel of the vehicle 100.

The processor 870 can control the object detection apparatus 300 to track an occupant getting of the vehicle 100 and detect a distance between the occupant and the vehicle 100.

The processor 870 can determine whether the occupant has moved out of the vehicle 100 by a predetermined distance or more, based on object information acquired from the object detection apparatus 300.

The processor 870 can acquire location information of the occupant, received from a mobile terminal of the occupant, from the communication apparatus 400.

The processor 870 can acquire, from the communication apparatus 400, occupant location information which includes information indicating whether the occupant is located inside or outside the vehicle 100.

The processor 870 can acquire occupant location information which includes information about a distance between the occupant and the vehicle 100.

The processor 870 can determine whether the occupant has moved out of the vehicle 100 by a predetermined distance or more, based on the occupant's location information acquired from the communication apparatus 400.

The processor 870 can determine whether the occupant has been out of the vehicle 100 for a predetermined period of time or more, based on the occupant's location information acquired from the communication apparatus 400.

When it is determined that the occupant has moved out of the vehicle 100 by a predetermined distance or more or has been out of the vehicle 100 for a predetermined period or more, the processor 870 can perform an autonomous parking operation.

Thus, in the situation where an occupant moves out of the vehicle 100 for a while, for example, where the occupant stops by a roadside store, the processor 870 can keep the vehicle 100 in a standby state, thereby improving the occupant's user experience.

However, if there is an ambulance even before it is determined that the occupant has moved out of the vehicle 100 at the predetermined distance or more or has been out of the vehicle 100 for the predetermined period or more, the processor 870 can control the vehicle drive apparatus 600 using the interface unit 830 to cause the vehicle 100 to move.

However, if it is determined that the vehicle 100 has been stopped for a period exceeding a certain stopping allowed period even before it is determined that the occupant has moved out of the vehicle 100 by the predetermined distance or more or for the predetermined period or more, the processor 870 can control the vehicle drive apparatus 600 using the interface unit 830 to cause the vehicle 100 to move.

The processor 870 can acquire user input information related to a place from the input unit 210 or the communication apparatus 400 via the interface unit 830.

The user input information related to a place may include information about a getting-off location, information about a scheduled place of visit, and information about a boarding location.

The getting-off location may be defined as a location at which an occupant gets off the vehicle 100 to move out of the vehicle 100.

The place of visit may be defined as a facility that an occupant visits by getting off the vehicle 100.

The boarding location may be defined as a location at which the occupant gets on the vehicle 100 again after stopping by a place of visit.

The user input information related to a place may be input by a user using the input unit 210, and the input by user may be a name of place. The user input information related to a place may be selection by a user among places displayed on the user input 210 that is integrally formed with the output unit 250. The user input information related to a place may be defined as any type of information based on which the processor 870 can determine a place.

For example, the user input information related to a place may include a user input on any one of a plurality of place images displayed on a touch screen.

The processor 870 can acquire user input information related to a place which is input by a user to the input unit 210.

The processor 870 can acquire user input information, received by the communication apparatus 400 from a mobile terminal of the user, via the communication apparatus 400.

The processor 870 can determine a return period based on user input information.

The processor 870 can determine a place of visit based on the user input in formation.

If the user manually inputs a place, the processor 870 can determine that the input place is a place of visit.

The processor 870 can determine a location of the place of visit, based on at least one of navigation information, information stored in the memory 840, and information provided from the communication apparatus 400.

Based on the current location of the vehicle 100 and a location of the place of visit, the processor 870 can determine a time required for an occupant to reach the place of visit after getting off the vehicle 100.

Based on the current location of the vehicle 100 and a location of the place of visit, the processor 870 can determine a period of time required for the occupant to walk back to the vehicle 100 after visiting the place of visit.

The processor 870 can determine a visit duration in the place of visit based on at least one of the navigation information, the information stored in the memory 840, and the information provided from the communication apparatus 400.

For example, if the occupants inputs a post office on the input unit 210 as a place of visit, the processor 870 can determine, based on information pre-stored in the memory 840, that predicted visit duration in the post office is 15 minutes.

The processor 870 can determine a return period by taking into account a time required for the occupant to travel to a place of visit from the vehicle 100, visit duration in the place of visit, and a time required for the occupant to return back to the vehicle 100 from the place of visit.

Via the interface unit 830, the processor 870 can acquire information about the occupant's visit time, which the communication 400 receives through Vehicle to Infrastructure (V2I) communication with infrastructure in a place of visit.

The information about the occupant's visit time may include the number of people waiting in the place of visit, a predicted waiting time in the place of visit, and an average visit duration in the place of visit.

The processor 870 can control the communication apparatus 400 to receive information about the occupant's visit time through V2I communication with infrastructure in a place of visit.

Via the communication apparatus 400, the processor 870 can acquire information about the occupant's visit time, which comprises at least one of the following: an entrance time of the occupant into a place of visit, a visit duration which is a period of time that the occupant stayed in a place of visit, and a predicted visit duration time which is a period of time that the occupant is predicted to stay in a place of visit.

The processor 870 can determine a return period, further based on information about the occupant's visit time.

For example, in the situation where the occupant visits a post office, the processor 870 can acquire, from the post office, information about an entrance time of the occupant into the post office. The processor 870 can acquire, from the post office, information about a predicted waiting time that is determined based on the number of people waiting in line at the post office. The processor 870 can determine a return period of the occupant, further based on the information about the entrance time and the information about the predicted waiting time.

Thus, the processor 870 can more precisely determine a return period based on user input information and V2I communication information, thereby improving user convenience.

The processor 870 can acquire navigation information, including information about a facility within a predetermined distance from the vehicle 100, from the navigation system 700. Based on the navigation information, the processor 870 can determine a predicted place of visit that an occupant is predicted to visit.

The predicted place of visit may be defined as a place of visit which is not input by a user but determined by the processor 870.

If an occupant gets off the vehicle 100 without inputting information about a return period, the processor 870 can determine, based on location information of the vehicle 100, a predicted place of visit that the occupant is predicted to visit.

Based on the location information of the vehicle 100 and location information of facilities existing within a predetermined distance from the vehicle 100, the processor 870 can determine a predicted place of visit that the occupant is predicted to visit.

For example, the processor 870 can determine facilities existing within a predetermined distance from the vehicle 100, and determine one of the facilities located closest to the vehicle 100 to be a predicted place of visit.

For example, the processor 870 can determine locations of one or more facilities nearby the vehicle 100, set priorities of the facilities according to their closeness to the vehicle 100, and determine a facility with the first priority to be a predicted place of visit.

The processor 870 can determine a return period based on a distance from the vehicle 100 to the predicted place of visit.

Thus, the processor 870 can predict a place of visit even when an occupant gets off without inputting the place of visit, thereby being enabled to provide a user-friendly interface.

Via the interface unit 830, the processor 870 can acquire at least one of schedule information and place-of-visit history information of the occupant from the memory 840 or a mobile terminal of the occupant.

The schedule information may include details of an occupant's schedule, a time of the schedule, a date of the schedule, duration of the schedule, etc.

The processor 870 can receive, from the memory 840 or a mobile terminal of an occupant, schedule information which includes: details of the occupant's schedule, a scheduled time of the schedule, a scheduled date of the schedule, duration of the schedule, etc.

For example, the schedule information may be information in the form such that "the occupant is scheduled to visit a post office from 11 am to 12 pm on Nov. 8, 2017."

The place-of-visit history information may include a previous place of visit, a visit date, a visit time, duration of each visit, etc.

The processor 870 can receive, from the memory 840 or a mobile terminal of the occupant, information about a previous visit place, a previous visit date, a previous visit time, previous visit duration, etc.

The processor 870 can determine a predicted place of visit, further based on at least one of schedule information and place-of-visit history information.

For example, the processor 870 can determine one of infrastructure facilities, existing within a predetermined distance from a getting-off location of an occupant, to be a predicted place of visit.

For example, the processor 870 can determine that a facility stored in an occupant's schedule among facilities within a predetermined distance from a getting-off location of the occupant is a predicted place of visit.

The processor 870 can control the interface unit 830 to transmit information about a predicted place of visit to a mobile terminal of the occupant.

Via the communication apparatus 400, the processor 870 can acquire user input information which the mobile terminal of the occupant acquires from the occupant.

The processor 870 can acquire information, input by the occupant to the mobile terminal, from the communication apparatus 400 via the interface unit 830.

Thus, the processor 870 can allow a user to confirm a predicted place of visit, thereby enabled to determine a return period more precisely.

As configured above, the operation system 800 may precisely determine a predicted place of visit which is predicted to be visited by an occupant, and may control the vehicle 100 to be located at an boarding location in accordance with a return period of the occupant, thereby improving user convenience.

When it is determined that a plurality of occupant gets off the vehicle 100, the processor 870 can determine a representative occupant for the plurality of occupants.

When a plurality of occupants including a driver gets off the vehicle 100, the processor 870 can determine that the driver is a representative occupant in the plurality of occupants.

When a plurality of occupants gets out of the vehicle 100, the processor 870 can determine that an occupant having the right to control the vehicle 100 is a representative occupant in the plurality of occupants.

The occupant having the right to control the vehicle 100 may be defined as a driver who is capable of driving a vehicle.

For example, the occupant having the right to control the vehicle may correspond to at least one of the following: a driver, an occupant leaving with a key of the vehicle 100, a person who is registered as allowed to drive the vehicle, and a person who is at the age legally able to drive or more.

The processor 870 can determine a return period with reference to a representative occupant.

Alternatively, the processor 870 can determine respective return periods of a plurality of occupants, and then determine that an occupant who is predicted to return at the earliest time is a representative occupant.

Thus, the processor 870 cancan perform an autonomous parking after a plurality of occupants gets off, and determine a time when the vehicle 100 returns to a boarding location of the plurality of occupants.

Upon detection of an occupant's getting out of the vehicle, the processor 870 can control the vehicle drive apparatus 600 so that the vehicle 100 cruises around until a return period is determined.

Cruising around may be defined as the situation where the vehicle 100 travels within a predetermined distance from the current location of the vehicle 100 without a destination.

Upon detection of an occupant's getting out of the vehicle, the processor 870 can perform an autonomous parking operation. The processor 870 can control the vehicle drive apparatus 600 to determine a target parking spot, generate a travel path from the current location of the vehicle 100 to the target parking spot, and control the vehicle 100 to travel along the travel path.

After the occupant's getting off, the processor 870 can keep the vehicle 100 stopped until a target parking spot is determined and a travel path is generated.

Since extra time is needed to collect information in addition to computation time of the processor 870 itself, a certain period may be taken to generate a travel path after an occupant's getting out of the vehicle.

For example, if an occupant gets off without inputting a place of visit, the processor 870 can receive location information of the occupant from a mobile terminal of the occupant to determine a place of visit. The processor 870 can determine that a place where the occupant stays for a certain period or more is a place of visit.

In this instance, while the occupant moves to the place of visit after getting off the vehicle 100 and stays in the place of visit for the certain period or more, the processor 870 is not allowed to determine a place of visit and thus not allowed to determine a return period as well.

In addition, determination of a target parking spot based on a return period and generation of a travel path based on the target parking spot may follow after determination of a place of visit.

The processor 870 can control the vehicle 100 to remain stopped until determining a place of visit and a return period of an occupant and generating a travel path.

Alternatively, before a place of visit by the occupant is determined or before a travel path to a target parking spot is generated even when the place of visit is already determined, the processor 870 can control the vehicle drive apparatus 600 to control the vehicle 100 to cruise around.

For example, in the situation where the vehicle 100 is located in an area where stopping is not allowed for a certain period or more, the vehicle 100 may need to leave the area even before a travel path is generated.

The processor 870 can generate a cruising-around path along which the vehicle 100 departs the current location of the vehicle 100 and returns back to the same location.

The processor 870 can generate a cruising-around path along which the vehicle 100 travels within a predetermined distance from the current location of the vehicle 100.

For example, the processor 870 can generate a cruising-around path along which the vehicle 100 departs the current location thereof, turns around one or more blocks in a clockwise direction or a counter-clockwise direction, and then returns back to the current location.

The processor 870 can control the vehicle drive apparatus 600 so that the vehicle 100 travels along a cruising-around path.

Thus, the processor 870 can control the vehicle 100 to autonomously travel without a destination even before a target parking spot is set.

When it is determined that a return period is equal to or greater than a preset value, the processor 870 can control the vehicle drive apparatus 600 to perform an autonomous parking operation.

The processor 870 can determine whether to perform the autonomous parking operation, based on a return period.

Depending on a surrounding environment, the processor 870 can differently set a reference value for a determination of whether to perform an autonomous parking operation.

For example, when it is determined that a return period is one hour or more at a first spot where stopping is allowed for one hour, the processor 870 can perform an autonomous parking operation.

For example, when it is determined that a return period is 30 minutes or more at a second spot where stopping is allowed for 30 minutes, the processor 870 can perform an autonomous parking operation.

For example, when it is determined that a return period is one hour or more when there is no limitation on stopping or parking due to a circumstance, the processor 870 can perform an autonomous parking operation.

Based on the determination of whether to perform an autonomous parking operation, the processor 870 can control the vehicle drive apparatus 600 to perform the autonomous parking operation.

The processor 870 can control the vehicle 100 to perform an autonomous parking operation by considering a stopping allowed time and to remain stopped when an occupant's return period is equal to or less than the stopping allowed time.

Thus, the processor 870 can control the vehicle 100 and improve user convenience.

When it is determined that a return period is less than a preset value, the processor 870 can control the vehicle drive apparatus 600 so that the vehicle 100 stops or cruises around.

When it is determined that the return period is less than the preset value, the processor 870 can determine whether to control the vehicle 100 to remain stopped at a getting-off location or control the vehicle 100 to cruise around.

When it is determined that the return period is less than the preset value, the processor 870 can determine whether the vehicle 100 is at a stopping allowed location.

Based on road information, the processor 870 can determine whether the vehicle 100 is in a stopping allowed area.

The road information may include information about a text or image painted on a road, a roadside traffic sign, a line painted on the road, etc.

The road information may be information stored in road infrastructure or a server, and may include information indicative of whether the vehicle 100 is in a stopping allowed area.

In addition, the road information may include all types of information which can be used as a basis for determining whether a vehicle is in a parking/stopping allowed area.

The processor 870 can acquire road information about a road in the surroundings of the vehicle 100 from at least one of the object detection apparatus 300, the communication apparatus 400, and the navigation system 770 via the interface unit 830.

The processor 870 can acquire object information including information about a road in the surroundings of the vehicle 100 from the object detection apparatus 300.

The processor 870 can acquire, from the object detection apparatus 300, object information which includes a traffic sign and an image painted on a road and which can be used to determine whether the vehicle 100 is in a stopping allowed area.

The processor 870 can acquire road information, received by the communication apparatus 400 from a device external to the vehicle 100, from the communication apparatus 400.

The processor 870 can control the communication apparatus 400 to receive road information from a server, road infrastructure, and another vehicle.

The processor 870 can acquire, from the navigation system 770, information about whether the vehicle 100 is in a stopping allowed area.

When the vehicle 100 is in a stopping allowed area, the processor 870 can control the vehicle drive apparatus 600 to stop the vehicle 100.

When it is determined that the vehicle 100 is stopped at a getting-off location of an occupant and that the getting-off location is within a stopping allowed area, the processor 870 can control the vehicle 100 to remain stopped.

When it is determined that the vehicle 100 is in a stopping prohibited area, the processor 870 can control the vehicle drive apparatus 600 to control the vehicle 100 to cruise around.

When it is determined that the vehicle 100 is in a stopping allowed area while moving from a boarding location, the processor 870 can control the vehicle drive apparatus 600 to control the vehicle 100 to stop.

Thus, the processor 870 can determine whether to control the vehicle 100 to stop or cruise around, and may actively control the vehicle 100 depending on a road condition.

When it is determined that a return period is longer than a travel period, the processor 870 can perform an autonomous parking operation.

The processor 870 can determine whether a return period is longer than a travel period.

If a return period is shorter than a travel period, it means that an occupant would return back earlier before an autonomous parking-out operation or an autonomous parking operation is complete, and thus, the autonomous parking-out operation may be unnecessary.

If there is a plurality of parking allowed spots, the processor 870 can determine a target parking spot among the plurality of parking allowed spots based on a distance from the vehicle 100.

The processor 870 can determine whether there is a plurality of parking allowed spots.

The processor 870 can determine whether there is a plurality of parking allowed spots within a predetermined distance from the vehicle 100.

A parking allowed spot may be defined as including the concept of a "space or place" where the vehicle 100 can be parked, such as a parking lot, and the concept of a "state" of a place where the vehicle 100 can be parked because the place is not occupied by another vehicle.

The plurality of parking allowed spots may be parking allowed spots in a plurality of different parking lots.

The plurality of parking allowed spots may be parking allowed spots in the same parking lot.

In addition, the processor 870 can determine a target parking spot from among a plurality of parking allowed spots, based on a travel period required for the vehicle 100 to move to each of the plurality of parking allowed spots.

For example, there may be a first parking allowed spot and a second parking allowed spot which is farther from the vehicle 100 than the first parking allowed spot. In this instance, due to a driving environment, it may take more time to move to the first parking allowed spot than the second parking allowed spot.

The processor 870 can acquire information about a driving environment from at least one of the object detection apparatus 300, the communication apparatus 400, and the navigation system 770 via the interface unit 830.

Further based on information about parking rates or prices in each of the plurality of parking allowed spots, the processor 870 can determine a target parking spot. The processor 870 can acquire information about parking rates in each of the plurality of parking allowed spots.

Information about parking rates may include information about a parking-rate unit time, a parking rate per unit time, parking rates depending on a vehicle type, and any other element required to calculate parking fees when the vehicle 100 is parked in a parking space.

For example, if the plurality of parking allowed spots includes a paid parking lot, the processor 870 can determine a target parking spot from among free parking spots.

For example, when there is a first spot, which is a paid parking spot, and a second spot, which is a free parking spot but 1 km farther than the first spot, the processor 870 can determine a target parking spot based on a preset standard.

For example, if an increase in parking fees is reduced by a predetermined amount every 1 km away from the current location of the vehicle 100, the processor 870 can select a target parking spot which is far but which charges less parking fees.

The processor 870 can determine a travel period based on a travel path and surrounding environment information.

Based on map data, the processor 870 can generate a travel path, along which the vehicle 100 returns back to the current location of the vehicle 100.

The processor 870 can acquire the map data from at least one of the navigation system 770, the communication apparatus 400, and the object detection apparatus 300 via the interface unit 830.

The map data may be defined as including information about a road and an object near the road.

The processor 870 can acquire map data which includes information about a road and an object near the road.

Based on the map data, the processor 870 can generate a travel path from the current location of the vehicle 100 to a target parking spot and then from the target parking spot to a boarding location.

The processor 870 can acquire surrounding environment information about an environment in the surroundings of the travel path from at least one of the navigation system 700 and the communication apparatus 400.

Surrounding environment information may include information about an object located near the vehicle 100 when the vehicle 100 is traveling, being parked, or exiting a parking space.

The surrounding environment information may be defined as including information about an object located near a path along which the vehicle 100 is scheduled to travel, to be parked, or to exit a parking space.

Once a travel path is generated, the processor 870 can control at least one of the navigation system 770 and the communication apparatus 400 to request surrounding environment information about environment in the surroundings of the travel path from a device external to the vehicle 100.

The processor 870 can acquire surrounding environment information, received by the navigation system 770 or the communication apparatus 400 from road infrastructure or another vehicle, from the navigation system 770 or the communication apparatus 400.

The processor 870 can acquire surrounding environment information, received by the communication apparatus 400 through Vehicle-To-Everything (V2X Communication), from the communication apparatus 400.

With the vehicle 100 being parked, the processor 870 can perform an autonomous parking operation, based on an occupant's return period and travel period. The processor 870 can perform the autonomous parking operation, by providing a control signal to the vehicle drive apparatus 600 via the interface unit 830.

The processor 870 can determine a travel period required for the vehicle 100 to move from a target parking spot to a boarding location.

The processor 870 can determine the travel period based on a travel path from the target parking spot to the boarding location and surrounding environment information about environment in the surroundings of the travel path.

With the vehicle 100 being parked, the processor 870 can acquire surrounding environment information from the communication apparatus 400 via the interface unit 830 at a preset time interval. The processor 870 can determine a travel period based on a travel path and changed surrounding environment information.

With the vehicle 100 being parked, the processor 870 can constantly acquire surrounding environment information and determine a travel period based on the acquired surrounding environment information.

The processor 870 can control the communication apparatus 400 to request surrounding environment information from a device external to the vehicle 100 at a preset time interval.

Thus, the processor 870 can update a travel period according to variable surrounding environment information, thereby controlling the vehicle 100 to arrive a boarding location at an occupant's return period.

When it is determined that the occupant's boarding location or return period is changed while the vehicle 100 is parked, the processor 870 can generate a travel path to move from a target parking spot to the changed boarding location before the changed return period, and then may perform an autonomous parking-out operation.

Unless any change is made, the processor 870 can determine that an occupant's boarding location is the same as a location where the occupant gets off.

With the vehicle 100 being parked, the processor 870 can determine whether an occupant's boarding location or return period is changed.

Based on user input information received by the communication apparatus 400 from a mobile terminal of the occupant, the processor 870 can determine whether the occupant's boarding location or return period is changed.

For example, if an occupant inputs a changed boarding location or a changed return period to a mobile terminal, user input information is transmitted from the mobile terminal to the communication apparatus 400 of the vehicle 100. Then, the processor 870 can acquire the user input information from the communication apparatus 870. Based on the user input information, the processor 870 can determine that the boarding location or the return period is changed.

With the vehicle 100 being parked, the processor 870 can acquire location information of an occupant, which is received by the communication apparatus 400 from a mobile terminal of the occupant, from the communication apparatus 400.

In spite of no input from the occupant, the processor 870 can determine, based on the occupant's location information, whether a boarding location or a return period needs to be changed.

The processor 870 can determine a boarding location and a return period based on the occupant's location information.

The processor 870 can determine that a parking allowed spot closest to a location of the occupant is a boarding location.

The processor 870 can determine a boarding location, based on a location of the occupant and a travel path after boarding of the occupant.

For example, the processor 870 can determine that a location on a travel path to return to an occupant's home within a parking allowed area closest to the occupant's location is a boarding location.

When it is determined, based on the occupant's location information, that there is a boarding location closer to a location of the occupant than a getting-off location of the occupant, the processor 870 can change the boarding location.

The processor 870 can determine a changed return period with reference to the changed boarding location.

When it is determined that a location of an occupant, which was used to determine a return period and a travel period, is changed, the processor 870 can determine whether there is any other boarding location closer to the occupant than the occupant's getting off location.

Thus, the processor 870 can change a boarding location to help an occupant to get on the vehicle conveniently, thereby improving user convenience.

When a boarding location or a return period is changed, the processor 870 can control the interface unit 830 so that information including the changed boarding location or the changed return period is transmitted to a mobile terminal of the occupant via the communication apparatus 400.

The mobile terminal may receive information including the changed boarding location or the changed return period from the processor 870, and display the received information for a user.

The mobile terminal may detect a user input received from the user about the changed boarding location or the changed return period.

For example, the mobile terminal may detect a user input of accepting or declining a change for a boarding location or a return period.

The mobile terminal may generate user input information based on the detected user input.

The mobile terminal may transmit the generated user input information to the operation system 800.

The processor 870 can acquire user input information, received by the communication apparatus 400 from the mobile terminal of the occupant, via the interface unit 830. The processor 870 can determine a boarding location and a return period, further based on the user input information.

When it is determined that a user accepts changing of the boarding location or the return period, the processor 870 can determine that the boarding location or the return period is changed.

When it is determined that the user declines changing of the boarding location or the return period, the processor 870 can determine that the boarding location or the return period is not to be changed.

In this instance, the processor 870 can determine that a boarding location is the same as an occupant's getting-off location, and may determine a return period with reference to the boarding location.

Thus, the processor 870 allows a user to select whether to change a boarding location, thereby providing a human machine interface with improved user experience.

When the boarding location is changed, the processor 870 can determine a return period with reference to the changed boarding location.

For example, in the situation where a return period at a first location which is an occupant's getting-off location is 2:00 pm and a boarding location is changed to a second spot which is closer to the current location of the occupant, a time required for a driver to move from a place of visit to the second spot may be shorter than a time required to move from the place of visit to the first spot. Thus, in the situation where the boarding location is changed to the second spot, the processor 870 can determine that a return period at the changed boarding location may be 1:50 pm.

When a boarding location is changed, the processor 870 can generate a travel path from a target parking spot to the changed boarding location.

When a travel path is changed, the processor 870 can determine a travel period for travel along the changed travel path, based on the changed travel path and surrounding environment information about a surrounding environment of the travel path.

Based on the changed travel period, the processor 870 can determine a parking-out time based on the changed travel period and perform an autonomous parking-out operation.

Thus, the processor 870 can perform an autonomous parking-out operation to move vehicle 100 to a boarding location which is changed in response to change of a location of an occupant during parking.

In addition, the processor 870 can improve user convenience when performing an autonomous driving operation, an autonomous parking operation, and an autonomous parking-out operation.

The power supply unit 890 may supply power required to operate each unit under the control of the processor 870. The power supply unit 890 may be supplied with power from a battery inside of the vehicle 100.

Figure 9:
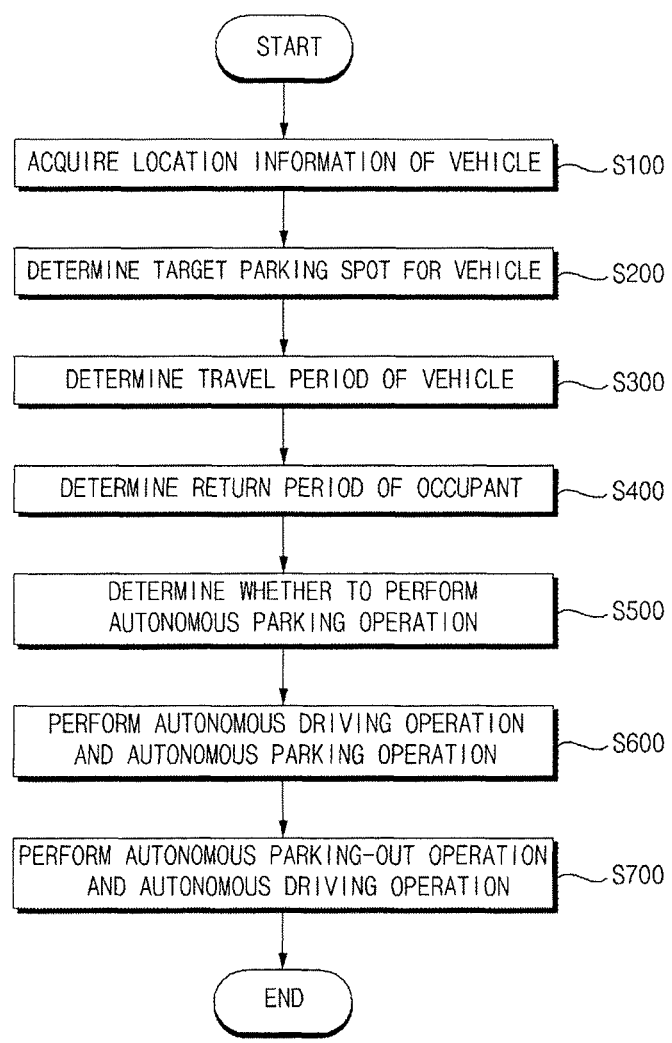
FIGS. 9 and 10 are flowcharts illustrating an operation system according to an embodiment of the present invention.
Figure 10:
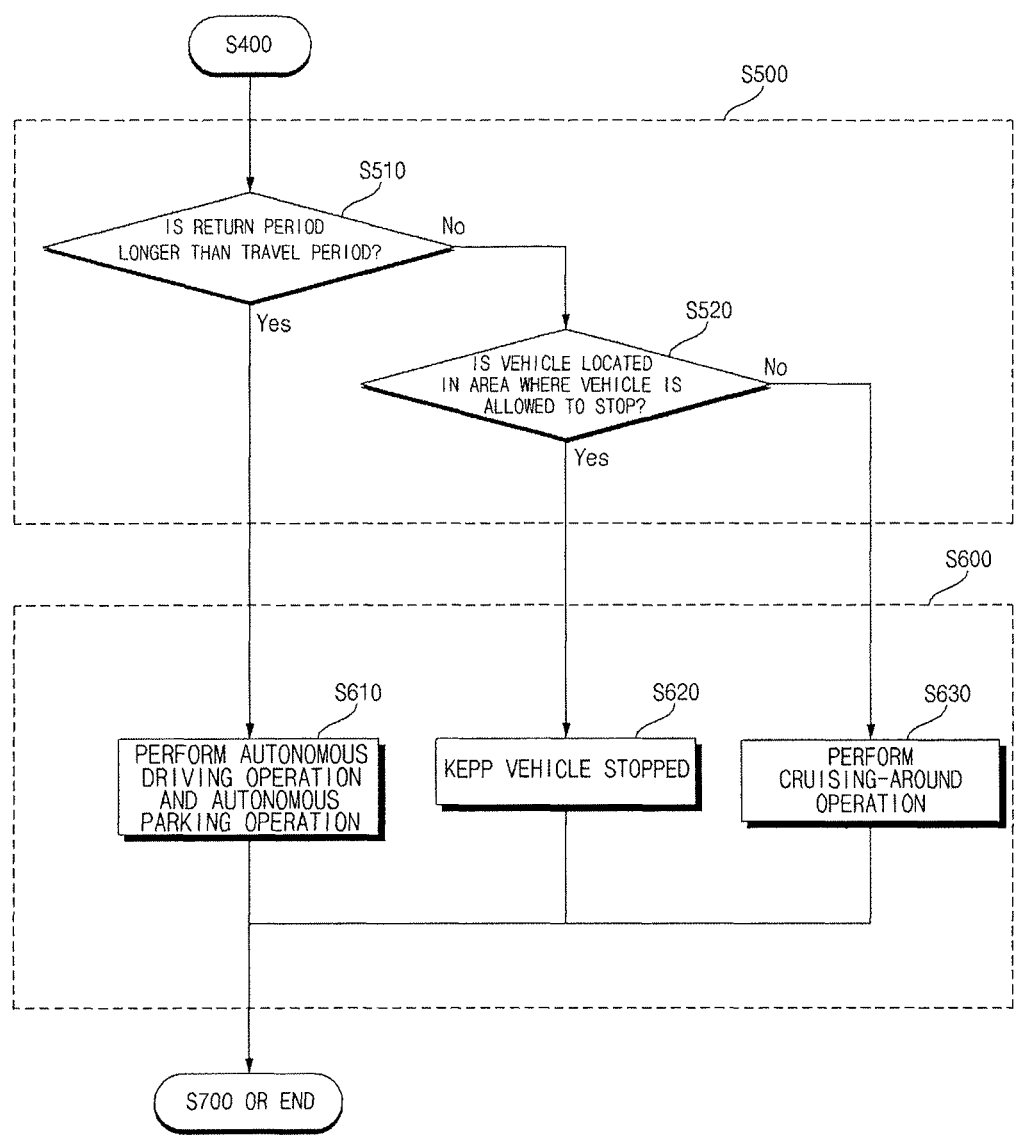

FIGS. 9 and 10 are flowcharts illustrating an operation system according to an embodiment of the present invention.

The processor 870 can acquire location information of the vehicle 100 via the interface unit 830 in S100.

The processor 870 can acquire location information of the vehicle 100 from at least one of the navigation system 770, the communication apparatus 400, and the object detection apparatus 300 via the interface unit 830.

Alternatively, the processor 870 can generate location information of the vehicle 100 based on object information acquired from the object detection apparatus 300.

Based on the location information of the vehicle 870, the processor 870 can determine a target parking spot in S200.

The processor 870 can determine whether an occupant's getting-off location is a parking allowed spot.

When it is determined that the occupant's getting-off location is a parking allowed spot, the processor 870 can determine the getting-off location is a target parking spot.

When it is determined that the occupant's getting-off location is a parking prohibited spot, the processor 870 can move the vehicle 100 and determine a target parking spot.

The processor 870 can acquire information about a parking allowed spot existing within a predetermined distance from the vehicle 100 from the navigation system 770 or the communication apparatus 400 via the interface unit 830.

Further based on the information about the parking allowed spot, the processor 870 can determine a target parking spot.

The processor 870 can acquire navigation information including information about a parking allowed place.

The navigation information may include the following: a location of the parking allowed place, a travel path from the current location of the vehicle 100 to the parking allowed place, a travel period, whether another vehicle is parked in the parking allowed place, parking rate information, etc.

The processor 870 can determine a parking allowed place based on navigation information.

Based on the navigation information, the processor 870 can determine whether there is a parking allowed place within a predetermined distance from the vehicle 100.

When there is a plurality of parking allowed places, the processor 870 can select a target parking spot among the plurality of parking allowed places with reference to a distance to the vehicle 100.

The processor 870 can determine a travel path from the current location of the vehicle 100 to a parking allowed place.

The processor 870 can determine that a parking allowed place is a target parking spot when the vehicle 100 can reach the parking allowed place along a travel path within a preset distance.

The processor 870 can determine that a parking allowed place which the vehicle 100 can reach by traveling the shortest travel distance among the plurality of parking allowed places is a target parking spot.

The processor 870 can set priorities of the plurality of parking allowed places according to a travel distance.

The processor 870 can receive parking rate information of a parking allowed spot from at least one of the navigation system 770, the communication apparatus 400, and the memory 840.

The parking rate information may include a parking fee charging method and a parking rate in a parking allowed place.

For example, the parking rate information may include a parking-rate unit time and a parking rate per unit time, as in the example of "500 KRW is charged every 30 minutes."

The processor 870 can provide a signal to the navigation system 770 or the communication apparatus 400 via the interface unit 830 to request parking rate information from a device external to the vehicle 100.

The processor 870 can set priorities of parking allowed places based on the parking rate information.

The processor 870 can set a distance to the vehicle 100 as a first parameter and parking rates as a second parameter. The processor 870 can determine a target parking spot among a plurality of parking allowed places by adding a weight to priorities dependent upon the first and second parameters.

The processor 870 can determine a travel period required to move from a getting-off location of an occupant to a target parking spot and then from the target parking spot to a boarding location of the occupant in S300.

Unless any change is made, the processor 870 can determine that the boarding location of the occupant is the same as the getting-off location of the occupant.

Once a target parking spot is determined, the processor 870 can generate a travel path required for the vehicle 100 to move from the current location of the vehicle 100 to the target parking spot and then from the target parking spot to the boarding location.

The processor 870 can acquire surrounding environment information about environment in the surroundings of the travel path.

The processor 870 can acquire surrounding environment information, received by the navigation system 770 or the communication apparatus 400 from an external device, via the interface unit 830.

The processor 870 can provide a control signal to the navigation system 770 or the communication apparatus 400 via the interface unit 830 to request surrounding environment information about environment in the surroundings of the travel path from a device external to the vehicle 100.

The processor 870 can periodically update the surrounding environment information.

The surrounding environment information changes in real time, and thus, it is necessary to update the surrounding environment information periodically.

The processor 870 can provide a control signal to the navigation system 770 or the communication apparatus 400 via the interface unit 830 to periodically request surrounding environment information about environment in the surroundings of a travel path from a device external to the vehicle 100.

The processor 870 can determine a travel period based on acquired surrounding environment information and an acquired travel path.

The processor 870 can determine a return period required for an occupant to get on the vehicle 100 again after getting off in S400.

The processor 870 can determine the return period based on a user input which is input by a user using the user interface apparatus 200.

The processor 870 can acquire the user input information from the user interface apparatus 200 via the interface unit 830.

When it is determined that the user inputs a return period, the processor 870 can determine that a value input by the user is the return period.

When it is determined that the user inputs a place of visit, the processor 870 can determine the return period based on the place of visit.

The processor 870 can acquire information about a predicted visit duration in the place of visit from the memory 840.

Via the interface unit 830, the processor 870 can acquire the occupant's return period information which is received by the communication apparatus 400 from a device external to the vehicle 100.

Through communication with a communication device provided in the place of visit, the communication apparatus 400 may receive the occupant's return period information.

For example, in the situation where a place of visit is a bank, the communication apparatus 400 may acquire information, including the number of people waiting in the bank and a predicted waiting time, through V2I communication.

The processor 870 can determine a predicted visit duration, which is a period of time that an occupant is predicted to stay in a place of visit, based on return period information acquired from infrastructure installed at the place of visit.

The processor 870 can calculate a return period which is a sum of the following: a travel period for the occupant to move from the vehicle 100 to the place of visit, visit duration in the place of visit, and a travel period from the place of visit to the vehicle 100.

Thus, the processor 870 can more precisely calculate the return period based on a user input and information acquired through V2I communication with infrastructure, thereby improving user convenience.

In the situation where an occupant gets off without a user input regarding a place of visit, the processor 870 can determine a return period of the occupant based on location information of the vehicle 100.

The processor 870 can determine a place which the occupant is predicted to visit, based on a location of the vehicle 100.

The processor 870 can determine a facility possible to visit in the surroundings of the vehicle 100 based on at least one of navigation information, object information, and information received from another device.

For example, the nearby facility may include public places possible to visit, such as a bank, a hospital, a rest stop, etc.

In the situation where a plurality of facilities possible to visit exists in the surroundings of the vehicle 100, the processor 870 can set priorities of the plurality of nearby facilities.

The processor 870 can set priorities of the plurality of facilities according to a distance from the vehicle 100.

The processor 870 can determine that a facility possible to visit with the highest priority is a predicted place of visit, and determine a return period with reference to the predicted place of visit.

The processor 870 can determine a place of visit based on place-of-visit information of the occupant.

The place-of-visit information of the occupant may include the following: information about a user input which the occupant inputs regarding a place of visit, information which is input by a user regarding the occupant's schedule, information which is previously determined by the processor 870 regarding a place of visit by the occupant, user input information received from the occupant's mobile terminal, location information of the occupant received from the mobile terminal of the occupant, etc.

The processor 870 can acquire, via the interface unit 830, information about a place of visit stored in the memory 840.

The processor 70 may provide a control signal to the communication apparatus 400 via the interface unit 830 to request place-of-visit information from the mobile terminal of the occupant.

The processor 870 can acquire place-of-visit information of the occupant, received from the mobile terminal of the occupant, from the communication apparatus 400.

Based on the place-of-visit information of the occupant, the processor 870 can determine a place of visit from among a plurality of nearby facilities possible to visit.

The processor 870 can set priorities of the plurality of nearby facilities based on a distance from the vehicle 100 and the place-of-visit information of the occupant.

For example, the processor 870 can determine that a facility stored in the occupant's schedule from among three nearby facilities possible to visit located closest to the vehicle 100 is a place of visit with the highest priority.

Upon detection of getting off of a plurality of occupants, the processor 870 can select a representative occupant which will be considered a to determine a return period.

The processor 870 can determine that a driver among a plurality of occupants out of the vehicle 100 is a representative occupant.

The processor 870 can determine that a driver who is capable of driving the vehicle 100 among the plurality of occupants out of the vehicle 100 is a representative occupant.

The processor 870 can determine who is capable of driving among a plurality of occupants, based on sensing information acquired from the user interface apparatus 200 or information acquired from the communication apparatus 400.

For example, the processor 870 can distinguish a driver and a passenger other than the driver, based on sensing information sensed using an internal camera. The processor 870 can determine whether the driver is healthy enough to drive the vehicle 100, based on sensing information sensed using a biometric sensing unit.

For example, the processor 870 can determine whether the driver is a person having the authority to drive the vehicle 100, based on authentication information acquired from the communication apparatus 400.

The processor 870 can determine a representative occupant from among a plurality of occupants, based on a user input which is input to the user interface apparatus 200.

The processor 870 can determine a return period with reference to the representative occupant.

Alternatively, the processor 870 can determine respective return periods of the plurality of occupants who has got off the vehicle 100.

The processor 870 can determine that the earliest return period among the respective return periods of the plurality of occupants who has got off the vehicle 100 is a return period of the occupants.

Thus, even when there is a plurality of occupants who has got off the vehicle 100, the processor 870 can determine a return period and perform an autonomous driving operation.

The processor 870 can determine whether to perform an autonomous driving operation, based on a travel period and a return period in S500.

When it is determined that the return period is equal to or greater than a preset value, the processor 870 can determine to perform an autonomous parking operation.

The processor 870 can change a value subject to comparison with the return period, depending on environment in the surroundings of the vehicle 100.

For example, when it is determined, based on object information, that the vehicle 100 is located in a spot where stopping is allowed for one hour, the processor 870 can determine to perform an autonomous parking operation in response to a return period equal to or greater than one hour.

Thus, the processor 870 can efficiently control the vehicle 100 in response to environment in the surroundings of the vehicle 100.

The processor 870 can determine whether to perform an autonomous parking operation, based on whether a return period is longer than a travel period in S510.

When it is determined that the return period is longer than the travel period, the processor 870 can determine to perform an autonomous parking operation.

When it is not determined that the return period is longer than the travel period, the processor 870 can determine whether the vehicle 100 is at a stopping allowed location in S520.

The processor 870 can acquire information from the navigation system 770, the communication apparatus 400, and the object detection apparatus 300 via the interface unit 830.

The processor 870 can determine whether the vehicle 100 is at a stopping allowed location, based on navigation information acquired from the navigation system 770.

The processor 870 can determine whether the vehicle 100 is at a stopping allowed location, based on information which is received by the communication apparatus 400 from another device.

The processor 870 can determine whether the vehicle 100 is at a stopping allowed location, based on object information acquired from the object detection apparatus 300.

The processor 870 can determine whether to control the vehicle 100 to remain stopped or cruise around, based on the determination of whether the vehicle 100 is in a stopping allowed area.

Alternatively, the processor 870 can determine whether to perform a cruising-around operation, based on determining whether to perform an autonomous parking operation.

When it is determined not to perform autonomous parking-in operation, the processor 870 can determine to control the vehicle 100 to be stopped or perform a cruising-around operation.

When it is determined that the vehicle 100 is located in a stopping allowed area, the processor 870 can determine to control the vehicle 100 to remain stopped.

When it is determined that the vehicle 100 is located in a stopping prohibited area, the processor 870 can determine to perform a cruising-around operation.

The processor 870 can perform an autonomous driving operation and an autonomous parking operation, based on determining whether to perform an autonomous parking operation in S600.

Upon detection of an occupant's getting out of the vehicle, the processor 870 can perform autonomous driving operation and autonomous parking-in operation, based on a travel period and a return period.

When it is determined to perform an autonomous parking operation, the processor 870 can provide a control signal to the vehicle drive apparatus 600 via the interface unit 830 so that the vehicle 100 autonomously travels along a travel path and is autonomously parked at a target parking spot in S610.

When it is determined to keep the vehicle 100 stopped, the processor 870 can control the vehicle drive apparatus 600 using the interface unit 830 to keep the vehicle 100 stopped at a getting-off location of an occupant in S620.

When it is determined to perform a cruising-around operation, the processor 870 can control the vehicle drive apparatus 600 using the interface unit 830 to perform a cruising-around operation in S630.

With the vehicle 100 being parked, the processor 870 can perform an autonomous parking operation and an autonomous driving operation in S700.

The processor 870 can provide a signal to the vehicle drive apparatus 600 via the interface unit 830 to perform an autonomous parking operation.

With the vehicle 100 being parked, the processor 870 can determine a travel period based on a travel path and surrounding environment information.

The processor 870 can acquire environment information at a predetermined time interval from a device external to the vehicle 100 via the interface unit 830. The processor 870 can periodically determine a travel period based on the acquired surrounding environment information.

The processor 870 can change a travel path based on the surrounding environment information.

With the vehicle 100 being stopped, the processor 870 can determine a return period and a boarding location based on location information and input information of an occupant.

When it is determined that the return period and the boarding location are changed, the processor 870 can generate a travel path which is necessary for the vehicle 100 to move to the changed boarding location until the changed return period.

The processor 870 can determine a travel period based on the changed travel path. The processor 870 can determine a parking-out time based on a changed travel period.

The processor 870 can control the vehicle drive apparatus 600 via the interface unit 830 to perform an autonomous parking operation and an autonomous driving operation based on a travel period and a return period.

Figure 11A:
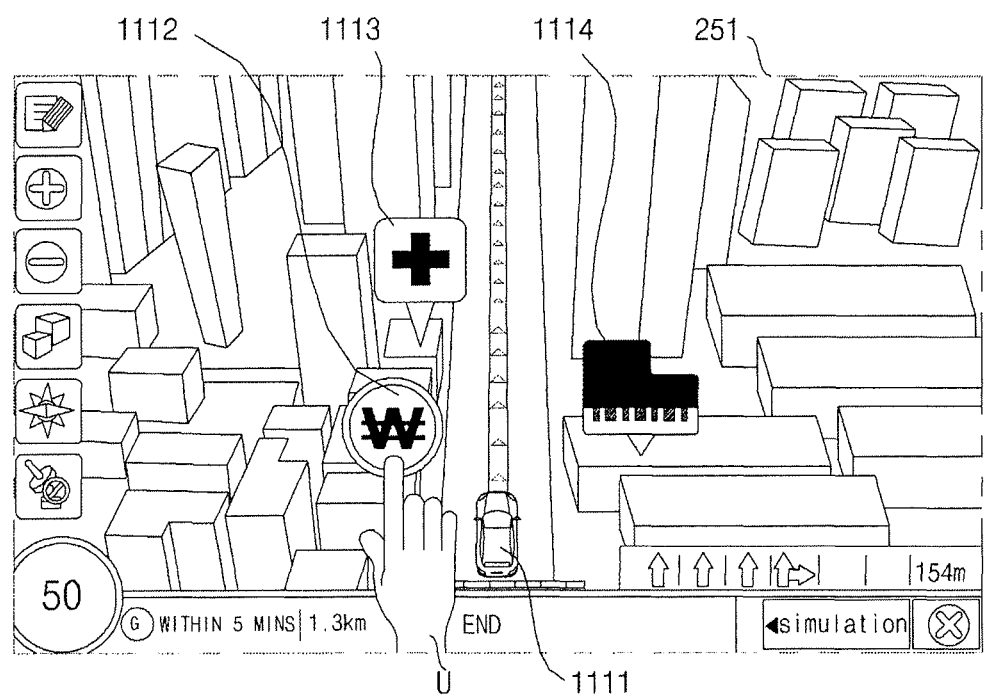
FIGS. 11*a* and 11*b* are diagrams illustrating an operation system according to an embodiment of the present invention.
Figure 11B:
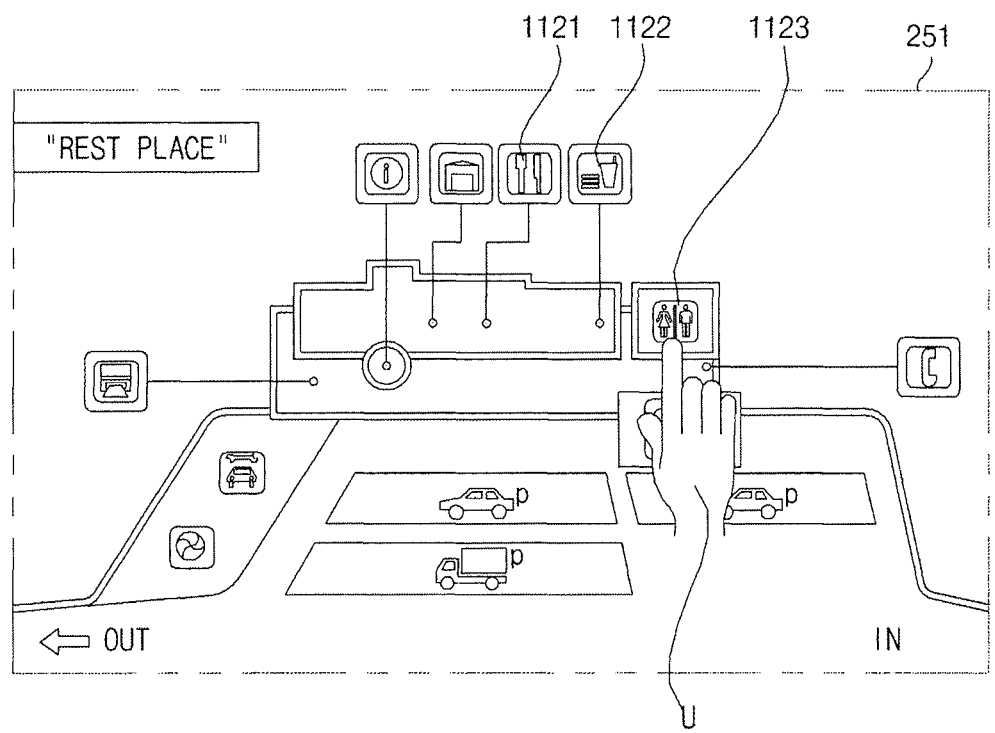

FIGS. 11a and 11b are diagrams illustrating an operation system according to an embodiment of the present invention.

To determine a target parking spot for the vehicle 100, the processor 870 can utilize information acquired via the interface unit 830.

Based on a travel period and a return period, the processor 870 can determine whether to perform an autonomous parking operation by moving the vehicle 100 to the target parking spot.

The processor 870 can determine a return period based on user input information related to a place, the user input information which is acquired from the input unit 210 or the communication apparatus 400 via the interface unit 830.

The input unit 210 may include a voice input unit 211, a gesture input unit 212, a touch input unit 213, and a mechanical input unit 214.

Referring to FIG. 11a, the processor 870 can control the display unit 251 via the interface unit 830 to display a map including facilities which exists in the surroundings of the vehicle 100.

The processor 870 can control the display unit 251 via the interface unit 830 to display a map including facilities which exists within a predetermined distance from the vehicle 100.

The processor 870 can control the display unit 251 to display a graphic image 1111, which is indicative of the vehicle 100, on the map displayed on the display unit 251.

The processor 870 can display graphic images of one or more facilities possible to visit on the map displayed on the display unit 251.

FIG. 11*a* shows graphic images of a concert hall, a bank, and a hospital which are facilities existing within a predetermined distance from the vehicle 100. In FIG. 11*a*, a graphic image 1112 indicates a bank, a graphic image 1113 indicates a hospital, and a graphic image 1114 indicates a concert hall.

The display unit 251 may be integrally formed with the touch input unit 231 to be implemented as a touch screen.

The processor 870 can determine a place of visit based on a user input U which is input on a touch screen.

If a user touches the graphic image 1112 indicative of a bank in FIG. 11*a*, the processor 870 can acquire a signal from the touch screen and determine that the bank is a place of visit by an occupant.

The processor 870 can determine a return period of the occupant with reference to the bank.

The processor 870 can determine whether to perform an autonomous parking operation, based on the return period and a travel period required to move to a target parking spot.

The processor 870 can control the vehicle 100 to perform an autonomous parking operation, a stopping operation, or a cruising-around operation.

Alternatively, the processor 870 can determine a place of visit based on a user input which is input through at least one of the voice input unit 211, the gesture input unit 212, and the mechanical input unit 214.

In addition, the processor 870 can enlarge one or more facilities possible to visit in a predetermined ratio on a map shown on the display unit 251.

FIG. 11*b* shows an image which is shown on the display unit 251 when the vehicle 100 enters a specific place, such as a highway rest stop.

When it is determined that the vehicle 100 has entered a highway rest stop, the processor 870 can control the display unit 251 to display facilities such as a restaurant, a restroom, and a gas station.

The processor 870 can control the display unit 251 so that graphic images indicative of the facilities are displayed on the display unit 251.

FIG. 11*b* is a diagram illustrating the situation where a graphic image 1121 indicative of a restaurant, a graphic image 1122 indicative of a fast food restaurant, and a graphic image 1123 indicative of a restroom are displayed on the display unit 251.

The processor 870 can determine a place of visit based on user input information.

For example, it is determined that a user applies an input U of touching the graphic image 1123 indicative of a restroom in FIG. 11*b*, the processor 870 can determine that a place of visit by an occupant is the restroom.

The processor 870 can determine a return period with reference to the restroom.

For example, the processor 870 can determine the return period by taking into account a travel period required to get to the restroom from the vehicle 100, a predetermined duration in restroom, and a travel period required for traveling from the restroom to the vehicle 100.

The processor 870 can determine a target parking spot in the rest stop.

The processor 870 can determine whether to perform autonomous parking operation, based on a travel period required to get to the target parking spot within the rest stop and an occupant's return period.

The processor 870 can perform an autonomous parking operation, a cruising-around operation, or a stopping operation, based on determining whether to perform the autonomous parking operation.

In addition, a map including facilities located in the surroundings of the vehicle 100 may be displayed in a mobile terminal of the occupant.

The processor 870 can acquire user input information for selecting a place of visit from the mobile terminal of the occupant via the communication apparatus 400.

As configured above, the operation system 800 may provide a User Interface (UI) which allows a user to input a place of visit conveniently.

Figure 12A:
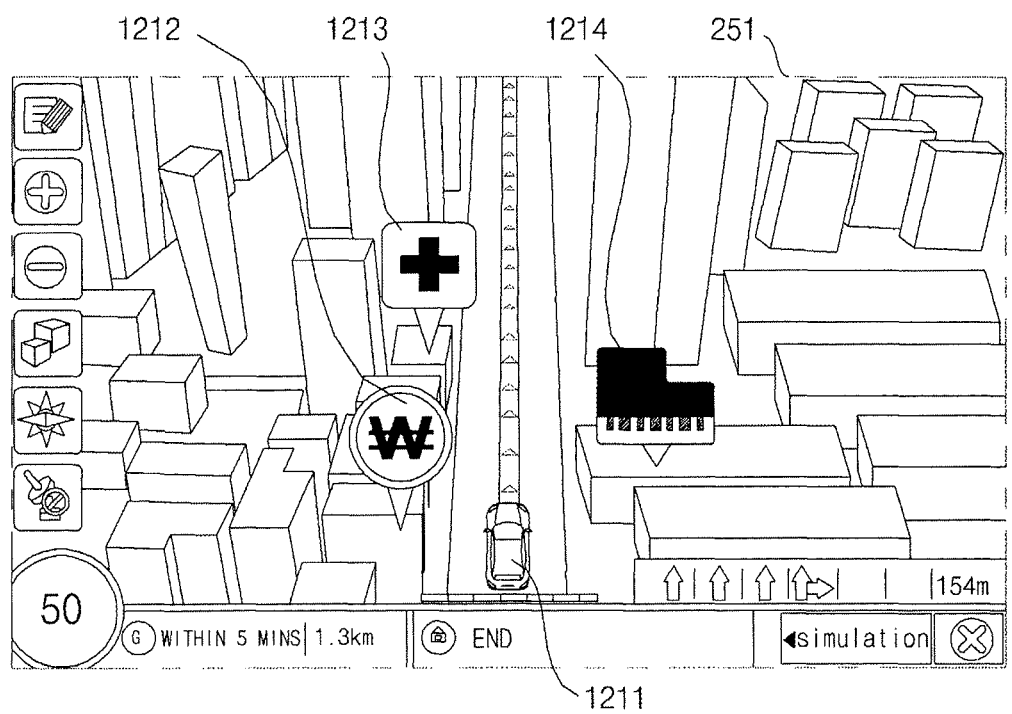
FIGS. 12*a* and 12*b* are diagrams illustrating an operation system according to an embodiment of the present invention.
Figure 12B:
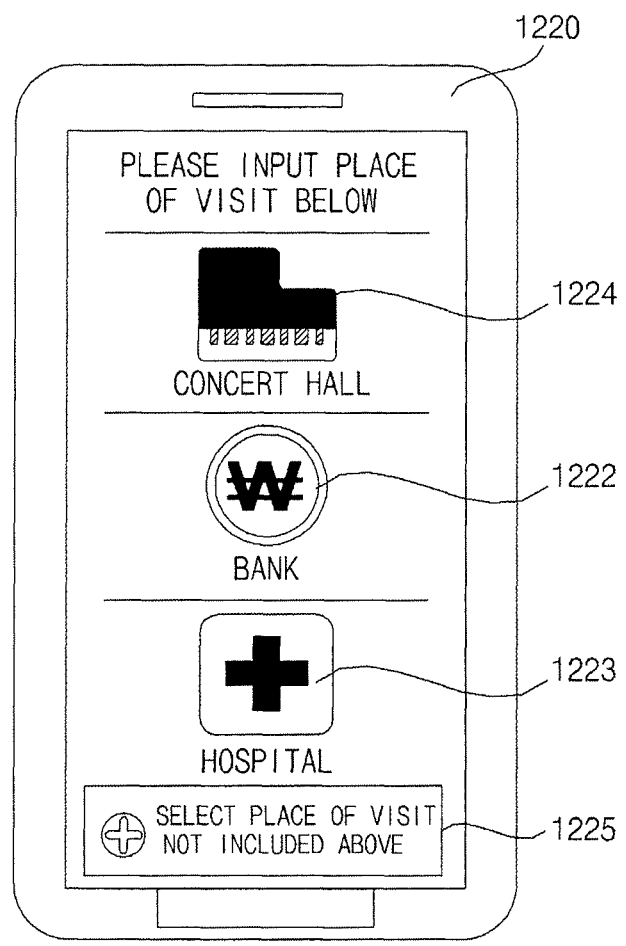

FIGS. 12*a* and 12*b* are diagrams illustrating an operation system according to an embodiment of the present invention.

The processor 870 can control the interface unit 830 to receive location information of the vehicle 100 from at least one of the navigation system 770, the communication apparatus 400, and the object detection apparatus 300.

The processor 870 can determine a target parking spot based on the location information of the vehicle 100.

The processor 870 can determine whether to perform an autonomous parking operation, by comparing a travel period for the vehicle 100 to get to the target parking spot and a return period for the occupant to return back to the vehicle 100 after getting off.

When the occupant has not input a return period, the processor 870 can determine a predicted place of visit which is predicted to be visited by the occupant. The processor 870 can determine a return period based on a distance between the vehicle 100 and the predicted place of visit.

Referring to FIG. 12*a*, the processor 870 can acquire navigation information including location information of the vehicle 100 via the interface unit 830.

The processor 870 can determine that a facility at a relatively shorter distance from a vehicle 1211 is a place of visit more likely to be visited by an occupant, and thus that the likelihood of being visited by the occupant decreases in order of a bank 1212, a concert hall 1214, and a hospital 1213.

When it is determined that there is a plurality of facilities likely to be visited by an occupant, the processor 870 can determine that the closest facility is a predicted place of visit.

For example, in FIG. 12*a*, the processor 870 can determine that a concert hall 1214 at the shortest distance from the vehicle 1211 is a predicted place of visit.

The processor 870 can determine an occupant's return period with reference to the concert hall 1214, and determine whether to perform autonomous parking operation based on the return period and a travel period. The processor 870 can control the vehicle drive apparatus 600 based on determining whether to perform autonomous parking operation, thereby enabled to perform autonomous driving operation and autonomous parking operation.

Referring to FIG. 12*b*, the processor 870 can provide information about a facility likely to be visited by an occupant to a mobile terminal 1220, so that the facility likely to be visited by the occupant is displayed in the mobile terminal 1220.

FIG. 12b is an example in which the mobile terminal 1220 displays a graphic image 1224 indicative of a concert hall, a graphic image 1222 indicative of a bank, a graphic image 1223 indicative of a hospital, and a graphic image for selection of other places, wherein the graphic images 1222, 1223, 1224, and 1225 are displayed in a top-to-bottom direction in order of decreasing levels of likelihood to be visited by the occupant and the levels of likelihood are determined based on information provided from the processor 870.

The processor 870 can determine a place of visit by receiving information, input by a user to the mobile terminal 1220, from the mobile terminal 1220.

As configured above, the operation system 800 may provide a user interface which allows a user to select a place of visit conveniently and which enables the processor 870 to determine the place of visit precisely, thereby providing a user-friendly system environment.

Figure 13A:
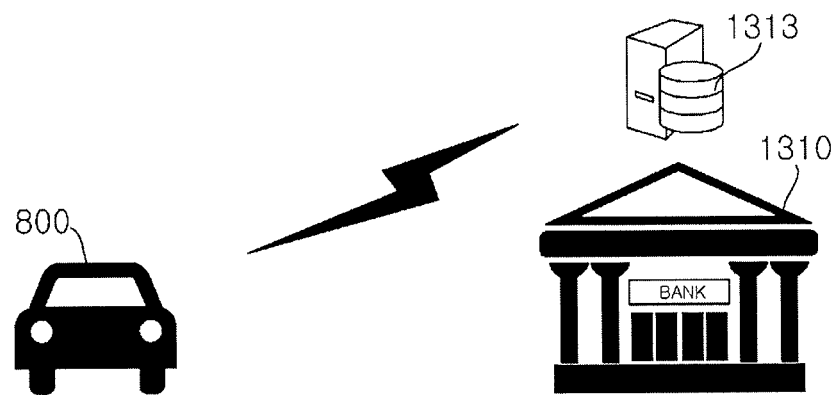
FIGS. 13*a* and 13*b* are diagrams illustrating an operation system according to an embodiment of the present invention.
Figure 13B:
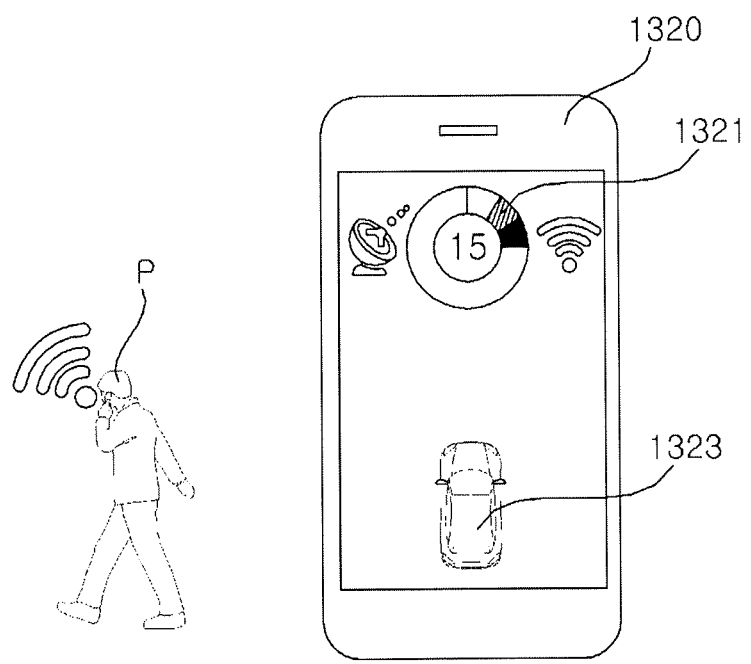

FIGS. 13a and 13b are diagrams illustrating an operation system according to an embodiment of the present invention.

The processor 870 can control the interface unit 830 to receive location information of the vehicle 100 from at least one of the navigation system 770, the communication apparatus 400, and the object detection apparatus 300.

The processor 870 can determine a target parking spot based on the location information of the vehicle 100.

The processor 870 can determine whether to perform an autonomous parking operation, by comparing a travel period for the vehicle 100 to get to the target parking spot and a return period for an occupant to return back to the vehicle 100 after getting out of the vehicle.

When the occupant did not input a return period, the processor 870 can determine a predicted place of visit. The processor 870 can determine a return period based on a distance between the vehicle 100 and the predicted place of visit.

Referring to FIG. 13a, the operation system 800 installed in the vehicle 100 may acquire information about a visit time of an occupant, which is received by the communication apparatus 400 through V2I communication with a place of visit by the occupants, via the interface unit 830.

The information about a visit time of the occupant, acquired through V2I communication, may be defined as including information about every element affecting a return period of the occupant among time-related elements about the place of visit.

For example, information about a visit time of the occupant, acquired through V2I communication, may include the number of people waiting in the place of visit, a predicted waiting time in the place of visit, and predicted visit duration in the place of visit.

The processor 870 can determine a return period of the occupant, further based on information about a visit time of the occupant.

In FIG. 13a, the processor 870 of the operation system 800 may receive, via the interface unit 830, information about a visit time of the occupant transmitted from a server 1313 of a bank 1310 which is a place of visit by the occupant.

Referring to FIG. 13b, the processor 870 can transmit information about the predicted visit duration in the place of visit to a mobile terminal of an occupant P, further based on information acquired through V2I communication.

The processor 870 can transmit information to the mobile terminal 1320 so that a graphic image indicative of predicted visit duration and a graphic image 1323 indicative of the vehicle 100 are displayed in the mobile terminal 1320.

The mobile terminal 1320 may be configured such that a predicted visit duration is changeable by the occupant's touch input to the graphic image 1321 indicative of the predicted visit duration.

The processor 870 can acquire information about a user input related to changing of the predicted visit duration from the mobile terminal 1320, and determine whether the predicted visit duration is changed.

As configured above, the operation system 800 may precisely determine a return period of an occupant and provide an interface which allows manipulating the return period, thereby improving user convenience.

Figure 14A:
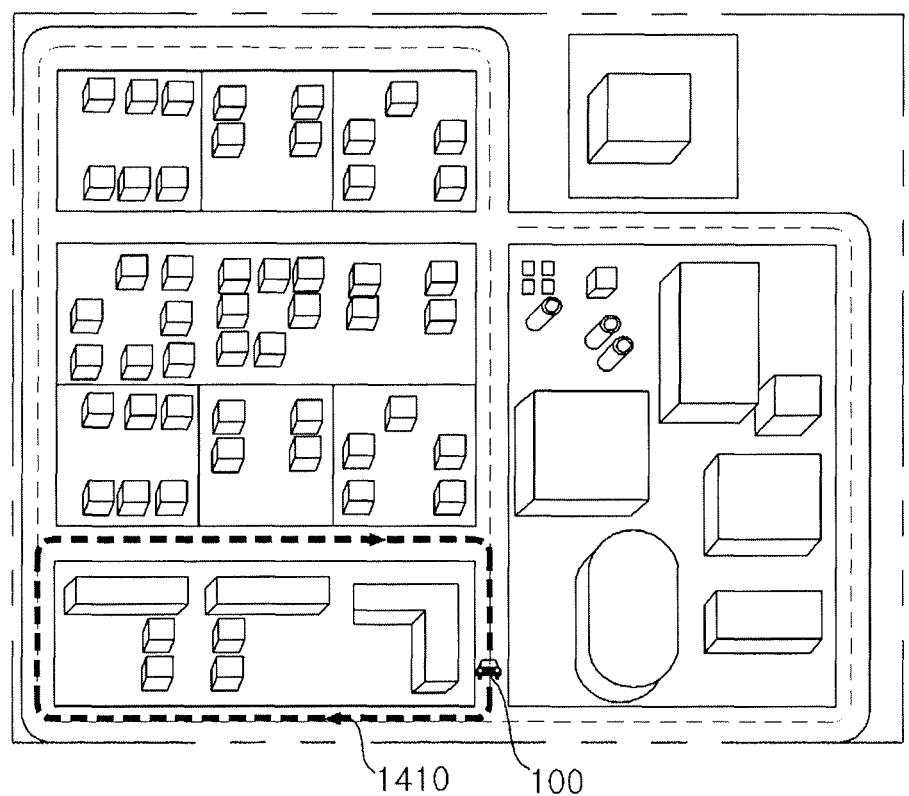
FIGS. 14*a* and 14*b* are diagrams illustrating a cruising-around operation by an operation system according to an embodiment of the present invention.
Figure 14B:
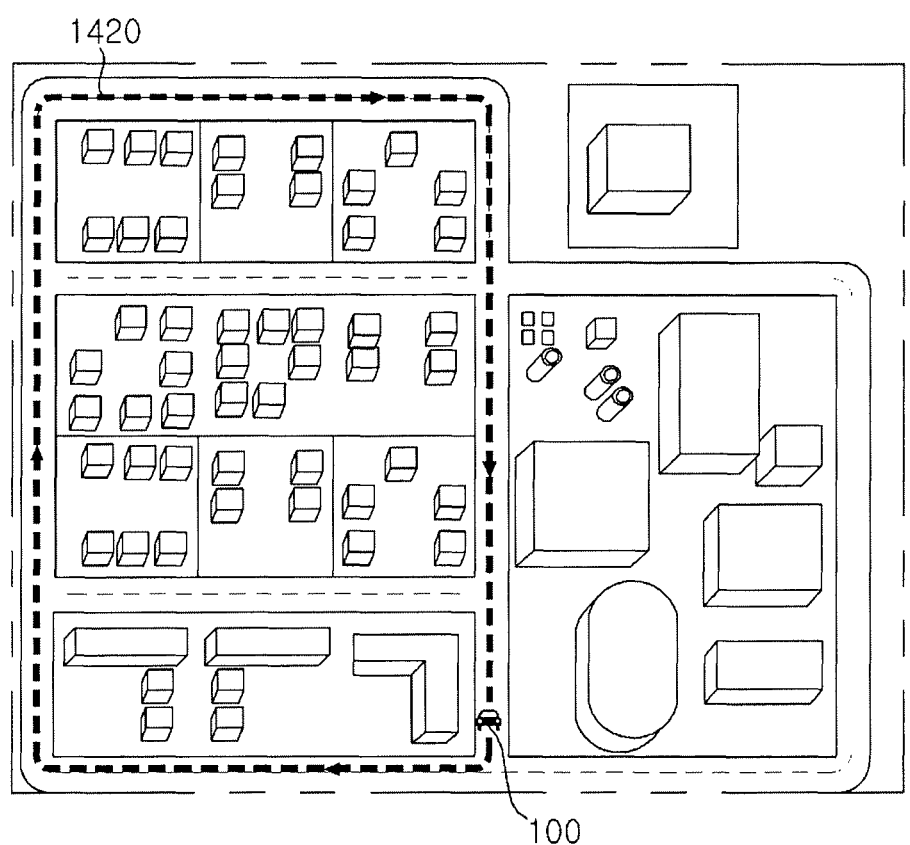

FIGS. 14a and 14b are diagrams illustrating a cruising-around operation by an operation system according to an embodiment of the present invention.

The processor 870 can acquire location information of the vehicle 100 from at least device provided in the vehicle 100 via the interface unit 830.

The processor 870 can determine a target parking spot based on the location information of the vehicle 100.

The processor 870 can determine whether to perform an autonomous parking operation or a cruising-around operation, by taking into account a return period and a travel period.

When it is determined that the return period is less than a preset value, the processor 870 can determine to perform a cruising-around operation or a stopping operation.

When it is determined that the return period is shorter than a travel period, the processor 870 can determine to perform a cruising-around operation or a stopping operation When it is determined to perform the cruising-around operation or the stopping operation, the processor 870 can determine whether the vehicle 100 is at a stopping allowed location.

The processor 870 can acquire information as to whether the vehicle 100 is at a stopping allowed location, from the navigation system 770, the communication apparatus 400, and the object detection apparatus 300 via the interface unit 830.

When it is determined that the vehicle 100 is located at a stopping restricted location, the processor 870 can perform cruise operation.

When it is determined to perform a cruising-around operation, the processor 870 can control the vehicle drive apparatus 600 to perform a cruising-around operation while determining a direction of travel in real time without a travel path.

In this instance, the processor 870 can determine a spot at which a direction of travel needs to be determined, such as an intersection, based on object information acquired from the object detection apparatus 300.

On the contrary, when it is determined to perform a cruising-around operation, the processor 870 can generate a cruising-around path.

The processor 870 can generate a cruising-around path so that the vehicle 100 departs the current location and then returns back to the same location.

The processor 870 can generate a cruising-around path so that the vehicle 100 travels within a preset distance from the current location of the vehicle 100.

For example, the processor 870 can generate a cruising-around path so that the vehicle 100 departs the current location and then returns back to the same location after traveling around one or more blocks in a clockwise direction or a counter-clockwise direction.

The processor 870 can control the vehicle drive apparatus 600 so that the vehicle 100 travels along the cruising-around path.

The processor 870 can generate a cruising-around path based on a return period.

The processor 870 can generate a cruising-around path, further based on surrounding environment information.

The processor 870 can generate a cruising-around path, further based on surrounding environment information which includes: road congestion, traffic condition, and information as to whether a traffic accident has occurred.

Referring to FIG. 14*a*, the processor 870 can generate a first cruising-around path 1410 in accordance with a return period. The processor 870 can generate the first cruising-around path 1410 so that the vehicle 100 travels along the first cruising-around path and then returns back to a boarding location in accordance with the return period.

The processor 870 can generate the first cruising-around path 1410 along which the vehicle 100 travels in a road which surrounds curbs located in a place of visit by an occupants. The processor 870 can control the vehicle drive apparatus 600 using the interface unit 830, so that the vehicle 100 travels around along the first cruising-around path 1410 and returns back to a getting-off location of an occupant.

FIG. 14*b* is a diagram illustrating a cruising-around path in the situation where a long return period of an occupant is given, compared to the example shown in FIG. 14*a*.

Referring to FIG. 14*b*, when it is determined that a return period longer than a return period in the example of FIG. 14*a* is given, the processor 870 can generate a second cruising-around path 1420 along which the vehicle 100 needs to travel a long travel distance compared to the second travel path.

The processor 870 can generate a second cruising-around path along which the vehicle 100 travels in a road that surrounds a plurality of blocks including a block where a place of visit by an occupant is located.

As configured above, the operation system 800 may allow, even in the middle of a cruising-around operation, an occupant to get on the vehicle 100 immediately after stopping by a place of visit, thereby improving user convenience.

In addition, the operation system 800 may control the vehicle 100 in a manner suitable for a restricted road condition, such as a parking/stopping restricted area.

Figure 15A:
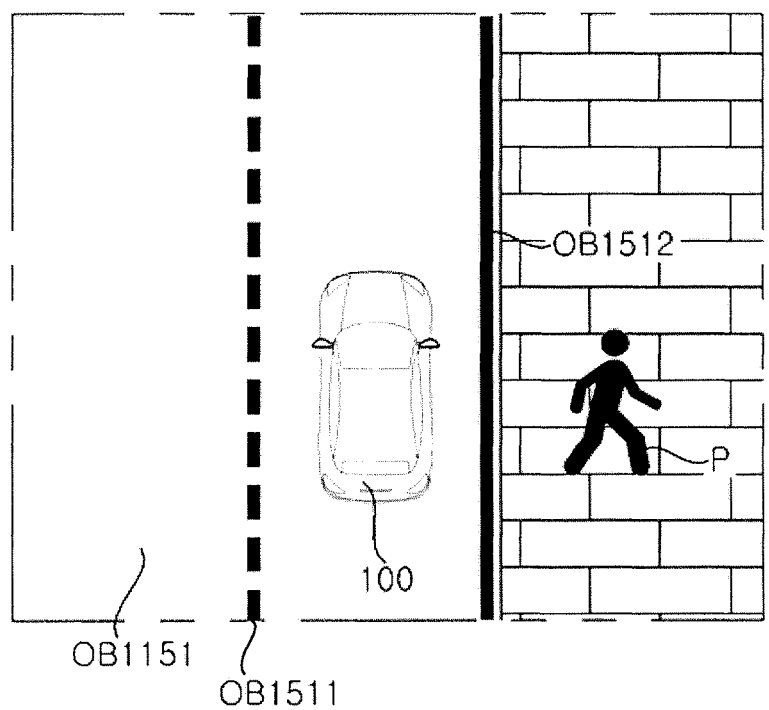
FIGS. 15a and 15b are diagrams illustrating a control method of an operation system according to an embodiment of the present invention.
Figure 15B:
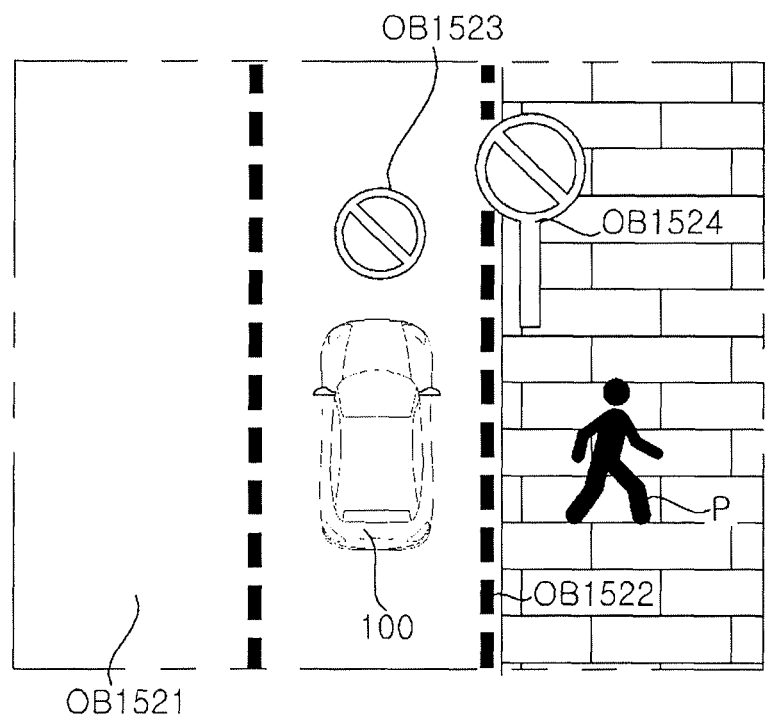

FIGS. 15*a* and 15*b* are diagrams illustrating a control method of an operation system according to an embodiment of the present invention.

The processor 870 can acquire location information of the vehicle 100 from at least one device provided in the vehicle 100 via the interface unit 830.

The processor 870 can determine a target parking spot based on the location information of the vehicle 100.

The processor 870 can determine whether to perform an autonomous parking operation or a cruising-around operation, by taking into consideration a return period and a travel period.

When it is determined the return period is less than a preset value, the processor 870 can determine to perform a cruising-around operation or a stopping operation.

When it is determined that the return period is shorter than a travel period, the processor 870 can determine to perform the cruising-around operation or the stopping operation.

When it is determined to determine to perform the cruising-around operation or the stopping operation, the processor 870 can determine whether the vehicle 100 is at a stopping allowed location.

The processor 870 can acquire information about whether the vehicle 100 is at a stopping allowed location, from the navigation system 770, the communication apparatus 400, and the object detection apparatus 300 via the interface unit 830.

FIG. 15*a* is a diagram illustrating an example in which the vehicle 100 stops in a road OB1151 marked with a line OB1511 indicating a parking allowed area and an occupant gets off the vehicle 100.

The processor 870 can detect the line OB1512, which indicates a parking allowed area, based on object information acquired from the object detection apparatus 300. Based on the detection, the processor 870 can determine that the vehicle 100 is located in the parking allowed area.

When it is determined that the vehicle 100 is located in the parking allowed area, the processor 870 can determine that a getting-off location of an occupant P is a target parking spot.

When it is determined that the getting-off location of the occupant P is a target parking spot, the processor 870 can control the vehicle drive apparatus 600 so that the vehicle 100 remains stopped until the occupant P returns back to the vehicle 100.

The processor 870 can provide a control signal to the door drive unit 631 via the interface unit 830 based on a return period of the occupant P so that doors of the vehicle 100 is locked or unlocked.

The processor 870 can provide a control signal to the power train drive unit 610 via the interface unit 830 based on the return period of the occupant P so that ignition of the vehicle 100 is turned on/off.

The processor 870 can determine the return period of the occupant P. The processor 870 can determine the return period based on information about an input from the occupant P. The processor 870 can determine the return period based on a determination of a place of visit for the occupant P.

In addition, when it is determined that a getting-off location of the occupant P is a target parking spot, the processor 870 can determine whether it is necessary to adjust a location of the vehicle 100.

For example, when it is determined that the vehicle 100 is located a predetermined distance from the edge of the road OB1151 where a pedestrian is located, the processor 870 can determine that it is necessary to adjust a location of the vehicle 100.

When it is determined necessary to adjust the location of the vehicle 100, the processor 870 can provide a control signal to the vehicle drive apparatus 600 via the interface unit 830 to adjust the location of the vehicle 100.

For example, the processor 870 can provide a control signal to the vehicle drive apparatus 600 via the interface unit 830 to move the vehicle 100 closer to the edge of the road OB1121 (e.g., move closer to line OB1512).

FIG. 15*b* illustrates an example in which the vehicle 100 is stopped on a road OB1521 where parking is prohibited but stopping is allowed only for a certain period of time.

In FIG. 15*b*, there are a line OB1522 indicating that stopping is allowed for a predetermined period of time, a mark OB1523 indicating a parking prohibited area, and a sign OB1524 indicating no parking.

The processor 870 can identify the line OB1522, which indicates a parking prohibited area, based on information acquired from the object detection apparatus 300. The processor 870 can identify the mark OB1523, which indicates a parking prohibited area, based on object information. The processor 870 can identify the no parking sign OB1524 based on the object information.

In addition, the processor 870 can determine whether the vehicle 100 is located in a parking/stopping allowed area, based on information acquired from an external server or road infrastructure.

When it is determined that the vehicle 100 is located in an area where parking is prohibited but stopping is allowed for a certain period of time, the processor 870 can determine a target parking spot where the vehicle 100 can be parked.

Based on the determination of the target parking spot, the processor 870 can determine whether to perform autonomous parking operation.

The processor 870 can determine whether to perform autonomous parking operation, based on a return period and a travel period, and perform an autonomous driving operation and an autonomous parking operation.

As configured above, the operation system 800 may take into consideration road condition, and perform autonomous driving operation and autonomous parking operation to allow an occupant to get on the vehicle 100 again at a desired time.

FIG. 16 is a diagram illustrating operation S200 in FIG. 9 of determining a target parking spot for a vehicle.

The processor 870 can acquire location information of the vehicle 100 from one or more devices provided in the vehicle 100 via the interface unit 830.

The processor 870 can determine a target parking spot for the vehicle 100 based on the location information of the vehicle 100.

When it is determined that a getting-off location of an occupant is a parking prohibited spot, the processor 870 can move the vehicle 100 and determine a target parking spot.

The processor 870 can request information about a parking allowed spot that exists within a predetermined distance from the vehicle 100, from the navigation system 770 or the communication apparatus 400 via the interface unit 830.

The processor 870 can request navigation information from the navigation system 770 or the communication apparatus 400, the navigation information which includes the following: a location of a parking allowed place, a travel path from the current location of the vehicle 100 to the parking allowed place, a travel period, whether another vehicle is already parked in the parking allowed place, and parking rates.

The processor 870 can determine a target parking spot based on the acquired information about the parking allowed spot.

FIG. 16 is a diagram illustrating an example of information about a plurality of parking allowed spots.

The processor 870 can acquire information about each element of each parking allowed spot in the form of a lookup table (LUT).

The processor 870 can acquire information includes information about first to fourth spots in terms of a distance from the vehicle 100, a travel period, and a parking rate per hour, as shown in FIG. 16. The processor 870 can select a target parking spot based on the acquired information.

For example, when a return period of the occupant is 60 minutes or more, the processor 870 can determine that the return period is longer than a travel period required to get to each of the first to fourth spots. Unless the occupant applies an input of selecting a specific parking spot, the processor 870 can determine that the third spot with free parking fee is a target parking spot.

For example, when an occupant's return period is 40 minutes, the travel period required to get to the third spot or fourth spot is equal or greater than the return period, and thus, the processor 870 can select a target parking spot from the first spot and the second spot. The processor 870 can select the second spot which is far but cheap, compared to the first spot.

For example, the processor 870 can acquire, via the input unit 210, an input of selecting one of a plurality modes which includes a distance-prioritized mode and a parking rate-prioritized mode.

When it is determined that the occupant selects a distance prioritized mode, the processor 870 can select the closest parking allowed spot as a target parking spot.

When the occupant selects a fee prioritized mode, the processor 870 can select a parking allowed spot with the most cheapest parking fees as a target parking spot.

Figure 17A:
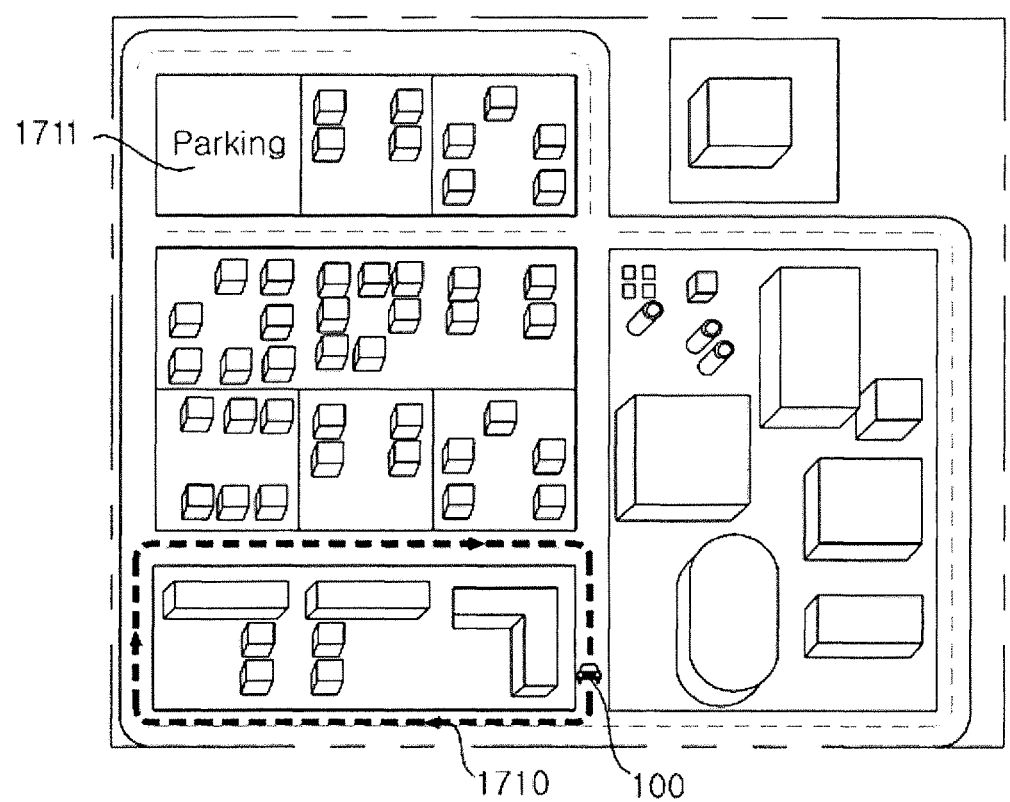
FIGS. 17a and 17b are diagrams illustrating an operation system according to an embodiment of the present invention.
Figure 17B:
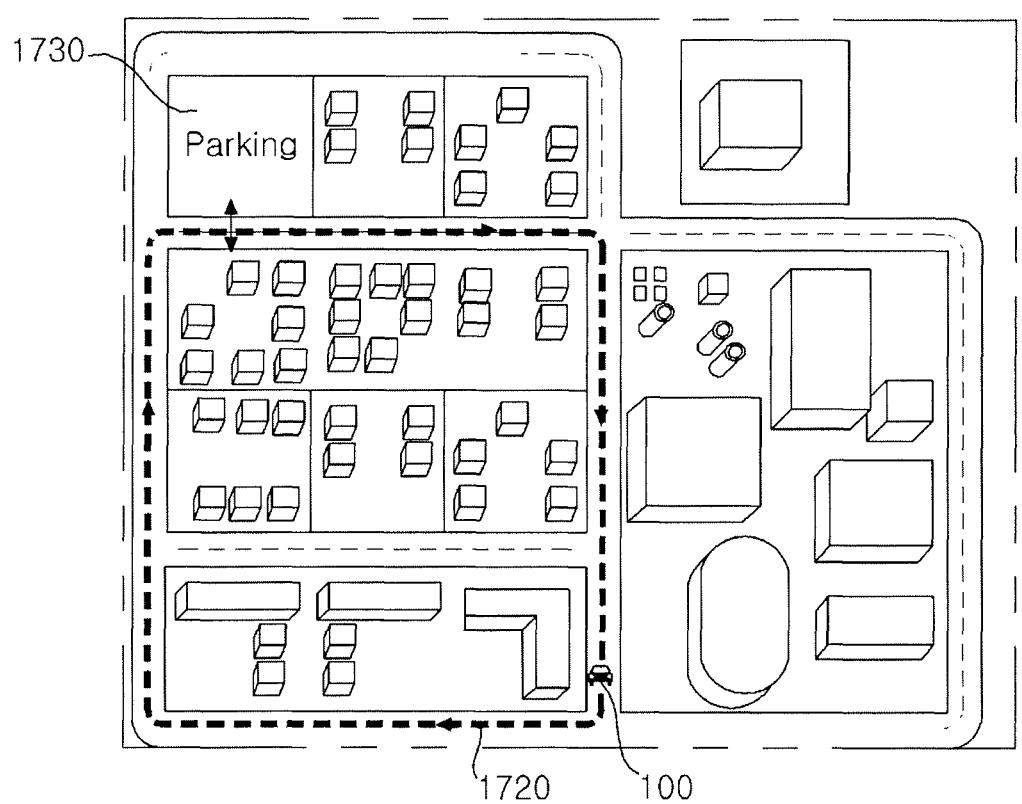

FIGS. 17a and 17b are diagrams illustrating an operation system according to an embodiment of the present invention.

The processor 870 can determine a location of the vehicle 100 based on location information of the vehicle 100, which is obtained via the interface unit 830.

The processor 870 can determine a target parking spot for the vehicle 100 based on the determination of the location of the vehicle 100.

Based on the determination of a target parking spot for the vehicle 100, the processor 870 can determine whether to perform autonomous parking operation. The processor may determine based on the occupant's return period and a travel period which is determined based on the target parking spot.

When the occupant gets off the vehicle 100 without inputting a return period or a place of visit, the processor 870 can determine a predicted place of visit which the occupant is predicted to visit. Based on the determination of the predicted place of visit, the processor 870 can determine the occupant's return period.

Referring to FIG. 17a, the processor 870 can control the vehicle 100 to cruise around before determining whether to perform an autonomous parking operation. Even in the situation of determining to perform autonomous parking operation, the processor 870 can control the vehicle 100 to cruise around for a while before an occupant enters a place of visit (e.g., in case the occupant changes his or her mind and decides to return to the vehicle, or the predicted place of visit is incorrect or changed).

The processor 870 can control the interface unit 830 to provide a control signal to the vehicle drive apparatus 600 so that the vehicle 100 travels along a cruising-around path 1710 or to automatically park at parking lot 1711.

The processor 870 can acquire location information of an occupant from a mobile terminal of the occupant via the communication apparatus 400. The processor 870 can acquire information about whether the occupant enters a place of visit, from a server at the place of visit through V2I communication.

The processor 870 can confirm entrance of the occupant into the place of visit, based on information acquired via the communication apparatus 400.

Referring to FIG. 17b, when the occupant's entrance into the place of visit is confirmed, the processor 870 can perform a control operation so that the vehicle 100 moves to a target parking spot and performs an autonomously driving operation.

When it is determined to perform an autonomous parking operation, the processor 870 can control the vehicle drive apparatus 600 via the interface unit 830 so that the vehicle 100 moves to a target parking spot after the occupant's entrance into the place of visit is confirmed.

The processor 870 can control the interface unit 830 to provide a control signal to the vehicle drive apparatus 600 so that the vehicle 100 moves to a target parking spot 1730 along a travel path 1720 and then from the target parking spot 1730 to a boarding location.

This aims to control the vehicle 100 after an occupant's entrance into a place of visit is confirmed. It is because, even though the processor 870 determines a predicted place of visit, it may be a wrong determination.

However, if the occupant inputs a place of visit even before the occupant's entrance into the place of visit is confirmed, it is possible to promptly control the vehicle 100 based on the determination of whether to perform an autonomous parking operation.

For example, if an occupant applies an input of selecting one of predicted places of visit which is displayed in a mobile terminal, the processor 870 can receive user input information from the mobile terminal to determine a place of visit.

In addition, when it is determined that maintenance is required on the vehicle 100 or that fuel is about to run out, the processor 870 can control the vehicle drive apparatus 60 via the interface unit 830 based on a return period and a travel period so that the vehicle 100 visits a maintenance shop or a gas station.

As configured above, the operation system 800 may actively control the vehicle 100 based on a location of an occupant to perform an autonomous driving operation, an autonomous parking operation, and an autonomous parking-out operation in accordance with a return period of the occupant even without a place of visit being input by a user.

Figure 18A:
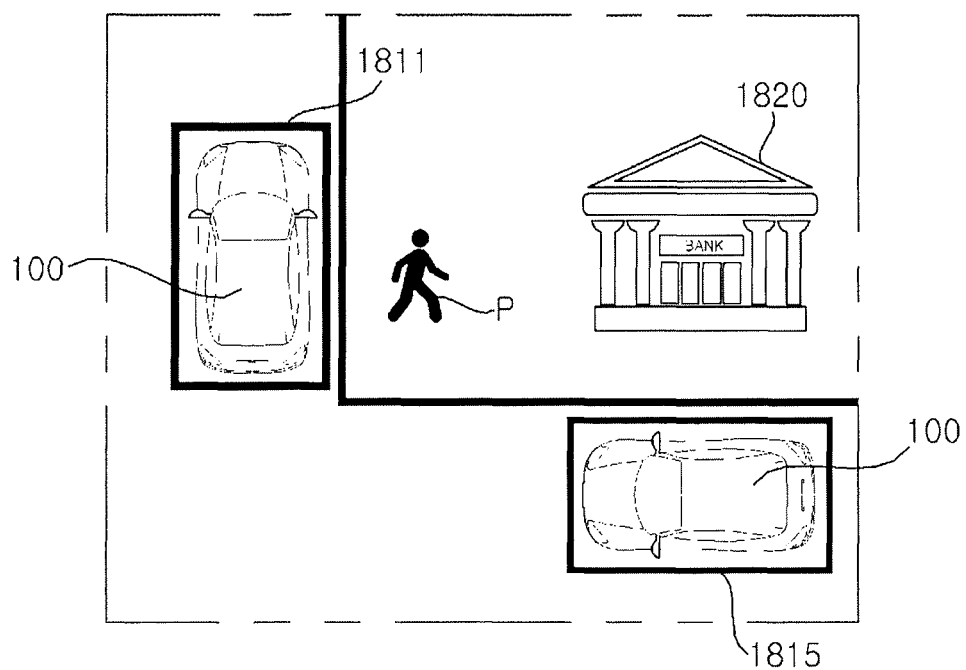
FIGS. 18a and 18b are diagrams illustrating an operation system according to an embodiment of the present invention.
Figure 18B:
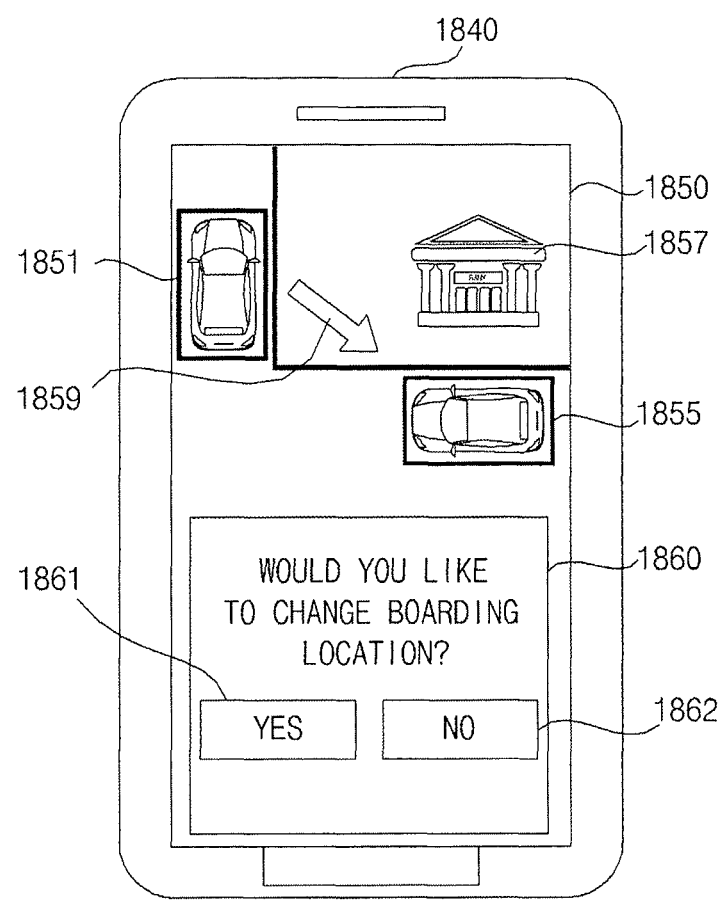

FIGS. 18a and 18b are diagrams illustrating an operation system according to an embodiment of the present invention.

With the vehicle 100 being parked, the processor 870 can determine a boarding location and a return period of an occupant based on location information of the occupant.

Referring to FIG. 18a, the processor 870 can identify a getting-off location 1811 at which an occupant P gets off the vehicle 100, based on location information of the occupant P.

After the occupant P gets off, the processor 870 can control the vehicle 100 to be autonomously parked.

With the vehicle 100 being parked, the processor 870 can determine whether there is a stopping allowed spot at a location closer than the occupant's getting-off location from a place 1820 of visit into which the occupant P has entered.

When it is determined that there is a stopping allowed spot at a location closer than the getting-off location from the place 1820 of visit, the processor 870 can determine that a location of the stopping allowed spot is a boarding allowed location 1815.

Referring to FIG. 18b, the processor 870 can transmit, from a mobile terminal 1840, information for requesting a confirmation on whether to change a boarding location into a boarding allowed location.

The processor 870 can provide information so that a map 1850 including the getting-off location 1811, the boarding allowed location 1815, and the place 1820 of visit is displayed in the mobile terminal 1840.

The processor 870 can transmit map information to the mobile terminal 1840 to display a graphic image 1851 indicative of the boarding location 1811 and a graphic image 1855 indicative of the boarding allowed location 1815.

The mobile terminal 1840 may perform a control action based on information received from the processor 870 to display a map including the getting-off location 1811, the boarding allowed location 1815, and the place 1850 of visit.

The mobile terminal 1840 may perform a control operation based on information received from the processor 870 to display an image 1857 indicative of the place 1820 of visit and the graphic image 1859 indicative of change of a boarding location.

Based on the information received from the processor 870, the mobile terminal 1840 may display a menu 1860 which allows a user to determine whether to change a boarding location.

The mobile terminal 1840 may transmit user input information about a user input on the menu 1860 to the processor 870.

Based on the user input information received from the mobile terminal 1840, the processor 870 can determine whether to change a boarding location into the boarding allowed location 1815.

For example, when it is determined that an occupant selects a menu item 1861 for changing a boarding location, the processor 870 can determine that the boarding allowed location 1815 is a boarding location.

For example, when it is determined that the occupant selects a menu item 1862 for declining change of a boarding location, the processor 870 can determine that the getting-off location 1811 is a boarding location.

When a boarding location is changed, the processor 870 can generate a travel path from a target parking spot to the changed boarding location.

When a travel path is changed, the processor 870 can determine, based on the changed travel path and on surrounding environment information about a surrounding environment of the travel path, a travel period for traveling along the changed travel path.

Based on a changed travel period, the processor 870 can determine a parking-out time and perform an autonomous parking-out operation.

As configured above, the operation system 800 may change a boarding location and a return period in accordance with a location of an occupant, and allow a user to confirm whether to change the boarding location and the return period, thereby enabled to control travel of the vehicle 100 in a user friendly way.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A vehicle control device for controlling a vehicle, comprising:
    a sensor configured to detect an occupant of the vehicle getting out of the vehicle at a drop-off location;
    an interface unit; and
    a processor configured to:
    determine a target parking spot for the vehicle based on information acquired through the interface unit, and
    in response to detecting the occupant getting out of the vehicle, transmit a control signal to a vehicle drive apparatus, via the interface unit, to park the vehicle at the target parking spot,
    wherein the processor is further configured to:
    determine a travel time period for moving from the drop-off location to the target parking spot and from the target parking spot back to the drop off location,
    determine a return time period for an amount of time between the occupant getting out of the vehicle at the drop-off location and returning to the vehicle, and
    in response to determining whether to perform an autonomous parking operation, a moving operation or a waiting operation based on the travel time period and the time return period, control the vehicle driver apparatus to move the vehicle or maintain a current position of the vehicle, and
    wherein the processor is further configured to:
    in response to the return time period being greater than or equal to a preset value, control the vehicle drive apparatus to perform the autonomous parking operation, and
    in response to the return time period being less than the preset value, control the vehicle drive apparatus to maintain the current position of the vehicle or automatically cruise around the drop-off location without a driver.

2. The vehicle control device according to claim 1, wherein the processor is further configured to:
    in response to detecting that the occupant has gotten out of the vehicle and moved a predetermined distance away from the vehicle or detecting that the occupant has gotten out of the vehicle and a predetermined period of time has elapsed since the occupant has gotten out of the vehicle, control the vehicle drive apparatus to move the vehicle,
    wherein the detecting that the occupant has gotten out of the vehicle is based on information acquired via the interface unit from at least one of a sensing unit, an object detection apparatus, and a communication apparatus provided in the vehicle.

3. The vehicle control device according to claim 2, wherein the processor is further configured to:
    acquire user input information regarding a place of visit from an input unit of the vehicle or the communication apparatus, via the interface unit, and
    determine the return time period based on the user input information.

4. The vehicle control device according to claim 3, wherein the processor is further configured to:
    receive information regarding a visit time of the occupant at the place of visit from the communication apparatus through vehicle-to-infrastructure (V2I) communication with infrastructure disposed at the place of visit, via the interface unit, and
    determine the return time period based on the information regarding the visit time and the user input information.

5. The vehicle control device according to claim 2, wherein the processor is further configured to:
    receive navigation information including location information of a facility located within a predetermined distance away from the vehicle,
    determine a predicted place of visit which is a place that the occupant is predicted to visit based on the navigation information, and
    determine the return time period based on a distance to the predicted place of visit from the drop-off location, a current location of the vehicle or the target parking spot.

6. The vehicle control device according to claim 5, wherein the processor is further configured to:
    receive at least one of schedule information and place-of-visit history information of the occupant from a memory of the vehicle or from a mobile terminal of the occupant, via the interface unit, and
    determine the predicted place of visit based on the at least one of the schedule information and the place-of-visit history information of the occupant, and the distance to the predicted place of visit from the drop-off location, the current location of the vehicle or the target parking spot.

7. The vehicle control device according to claim 5, wherein the processor is further configured to:
    detect a plurality of occupants getting out of the vehicle,
    determine a representative occupant from among the plurality of occupants, and
    determine the return time period based on the representative occupant.

8. The vehicle control device according to claim 2, wherein the processor is further configured to:
    after the occupant has gotten out of the vehicle, start a calculation of the return time period and control the vehicle drive apparatus to cause the vehicle to automatically cruise around the drop-off location without a driver until the calculation of the return time period has been completed.

9. The vehicle control device according to claim 2, wherein the processor is further configured to:
    receive road information for a road near or around the vehicle from at least one of the object detection apparatus, the communication apparatus, and a navigation system, via the interface unit,
    determine whether the vehicle is located in an area where the vehicle is allowed to stop based on the road information, and
    in response to determining that the vehicle is located in the area where the vehicle is allowed to stop, control the vehicle drive apparatus to stop the vehicle or maintain the current position of the vehicle.

10. The vehicle control device according to claim 2, wherein the processor is further configured to:
- in response to the return time period being greater than the travel time period, perform the autonomous parking operation.

11. The vehicle control device according to claim 10, wherein the processor is further configured to:
- in response to a plurality of parking allowed spots being available where parking of the vehicle is allowed, select the target parking spot from among the plurality of parking allowed spots based on a distance of each of the plurality of parking allowed spots from the vehicle or the drop-off location.

12. The vehicle control device according to claim 11, wherein the processor is further configured to:
- receive parking rate information for each of the plurality of parking allowed spots from at least one of a navigation system, the communication apparatus, and a memory of the vehicle, via the interface unit, and
- select the target parking spot from among the plurality of parking allowed spots based on the parking rate information and the distance of each of the plurality of parking allowed spots from the vehicle or the drop-off location.

13. The vehicle control device according to claim 10, wherein the processor is further configured to:
- generate a first travel path from a current location of the vehicle or the drop-off location to the target parking spot and from the target parking spot back to the drop-off location based on map data acquired via the interface unit,
- receive surrounding environment information regarding surroundings of the first travel path from at least one of a navigation system of the vehicle and the communication apparatus via the interface unit, and
- determine the travel time period based on the first travel path and the surrounding environment information.

14. The vehicle control device according to claim 2, wherein the processor is further configured to:
- transmit, while the vehicle is parked, a control signal to the vehicle drive apparatus to perform an autonomous parking-out operation for picking up the occupant based on the return time period and the travel time period.

15. The vehicle control device according to claim 14, wherein the processor is further configured to:
- determine, while the vehicle is parked, a second travel path from the target parking spot to a boarding location for the occupant to get on the vehicle,
- receive surrounding environment information regarding surroundings of the first travel path at a preset time interval from a communication apparatus of the vehicle via the interface unit, and
- determine the travel time period and perform the autonomous parking-out operation based on the second travel path and the surrounding environment information.

16. The vehicle control device according to claim 14, wherein the processor is further configured to:
- determine whether a boarding location for picking up the occupant has been changed or whether the return time period of the occupant has been changed,
- in response to determining that the boarding location has been changed to a changed boarding location, generate a third travel path from the target parking spot to the changed boarding location, and perform the autonomous parking-out operation based on the third travel path, and
- in response to determining that the return time period of the occupant has been changed to a changed return time period, perform the autonomous parking-out operation based on the changed return time period.

17. The vehicle control device according to claim 16, wherein the processor is further configured to:
- receive, while the vehicle is parked, location information of the occupant from a mobile terminal of the occupant, via the interface unit or a communication apparatus of the vehicle,
- determine, while the vehicle is parked, the boarding location and the return time period based on the location information of the occupant,
- in response to determining that the boarding location or the return time period has been changed, transmit a control signal to the communication apparatus via the interface unit for controlling the communication apparatus to transmit information regarding the changed boarding location or the changed return time period to the mobile terminal,
- receive user input information by the communication apparatus from the mobile terminal, via the interface unit, and
- determine the boarding location and the return time period based on the user input information.

\* \* \* \* \*